(12) United States Patent
Chu et al.

(10) Patent No.: US 12,314,574 B2
(45) Date of Patent: *May 27, 2025

(54) SYSTEM, DEVICE, AND METHOD FOR WRITING DATA TO PROTECTED REGION

(71) Applicant: SAMSUNG ELECTRONICS CO., LTD., Suwon-si (KR)

(72) Inventors: Younsung Chu, Yongin-si (KR); Jisoo Kim, Seongnam-si (KR); Hyungsup Kim, Hwaseong-si (KR); Yongsuk Lee, Gunpo-si (KR); Hyunsook Hong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 988 days.

This patent is subject to a terminal disclaimer.

(21) Appl. No.: 17/374,098

(22) Filed: Jul. 13, 2021

(65) Prior Publication Data

US 2022/0187997 A1    Jun. 16, 2022

(30) Foreign Application Priority Data

Dec. 16, 2020    (KR) .................. 10-2020-0176600

(51) Int. Cl.
*G06F 21/00*    (2013.01)
*G06F 3/06*    (2006.01)
(Continued)

(52) U.S. Cl.
CPC .......... *G06F 3/0622* (2013.01); *G06F 3/0655* (2013.01); *G06F 3/0679* (2013.01); *G06F 21/44* (2013.01); *G06F 7/58* (2013.01)

(58) Field of Classification Search
CPC .... G06F 3/0622; G06F 3/0655; G06F 3/0679; G06F 21/44
See application file for complete search history.

(56) References Cited

U.S. PATENT DOCUMENTS 10,257,192 B2    4/2019    Shin et al.
10,671,544 B2    6/2020    Kim
(Continued)

FOREIGN PATENT DOCUMENTS

CN           106850232 A    6/2017
KR    10-2019-0092948 A    8/2019

OTHER PUBLICATIONS

NVM Express Revision 1.2b, Jun. 3, 2016.
NVM Express Base Specification, Jun. 10, 2019.
JEDEC Standard Universal Flash Storage Version 3.1, Jan. 2018.

*Primary Examiner* — Rodman Alexander Mahmoudi
(74) *Attorney, Agent, or Firm* — Muir Patent Law, PLLC

(57) ABSTRACT

A storage device configured to communicate with a host, the storage device including: a memory including a protected region; and a controller configured to provide the host with a first response including a first device message authentication code and a first device message, receive a first write request from the host, the first write request including a first host message authentication code and a first host message, generate a first message verification code based on the first device message authentication code and the first host message, verify the first write request based on the first host message authentication code and the first message verification code, and write data included in the first write request to the protected region when the verification of the first write request succeeds.

19 Claims, 25 Drawing Sheets

(51) Int. Cl.
*G06F 21/44* (2013.01)
*G06F 7/58* (2006.01)

(56) References Cited

U.S. PATENT DOCUMENTS

| | | |
|---|---|---|
| 2012/0331290 A1 | 12/2012 | Margolis et al. |
| 2019/0278914 A1 | 9/2019 | Le Roy et al. |
| 2020/0014544 A1 | 1/2020 | Sela et al. |
| 2021/0278978 A1* | 9/2021 | Lee .......................... G06F 21/78 |

* cited by examiner

SYSTEM, DEVICE, AND METHOD FOR WRITING DATA TO PROTECTED REGION

CROSS-REFERENCE TO RELATED APPLICATION

Korean Patent Application No. 10-2020-0176600, filed on Dec. 16, 2020 in the Korean Intellectual Property Office, and entitled: "System, Device, and Method for Writing Data to Protected Region," is incorporated by reference herein in its entirety.

BACKGROUND

1. Field

Embodiments relate to a storage device, and more particularly, to a system, device, and method for writing data to a protected region.

2. Description of the Related Art

Storage devices storing data may be used in various applications. Recently, storage devices including memory devices manufactured by semiconductor processes have been widely used. Storage devices may provide a host with a protected region for storing data requiring security and permit only authenticated access to the protected region. Various attacks may be made on a storage device and/or a host to acquire and/or change data stored in a protected region or to insert an error in access to the protected region. Therefore, it may be important to accurately authenticate access to a protected region.

SUMMARY

Embodiments are directed to a method of writing data to a protected region in response to a write request of a host, the method including: transmitting a first response to the host, the first response including a first device message authentication code and a first device message; receiving a first request from the host, the first request including a first host message authentication code and a first host message; generating a first message verification code based on the first device message authentication code and the first host message; verifying the first request based on the first host message authentication code and the first message verification code; generating a second device message authentication code based on a second device message and the first message verification code, the second device message including a result of verifying the first request; and transmitting a second response to the host, the second response including the second device message authentication code and the second device message.

Embodiments are also directed to a storage device configured to communicate with a host, the storage device including: a memory including a protected region; and a controller configured to provide the host with a first response including a first device message authentication code and a first device message, receive a first write request from the host, the first write request including a first host message authentication code and a first host message, generate a first message verification code based on the first device message authentication code and the first host message, verify the first write request based on the first host message authentication code and the first message verification code, and write data included in the first write request to the protected region when the verification of the first write request succeeds.

Embodiments are also directed to a method of writing data to a storage device including a protected region, the method including: transmitting a first request to the storage device, the first request including a first host message authentication code and a first host message; receiving a first response from the storage device, the first response including a first device message authentication code and a first device message; generating a first message verification code based on the first host message authentication code and the first device message; verifying the first response based on the first device message authentication code and the first message verification code; generating a second host message authentication code based on the first message verification code and a second host message when the verification of the first response succeeds; and transmitting a second request to the storage device, the second request including the second host message authentication code and the second host message.

BRIEF DESCRIPTION OF THE DRAWINGS

Features will become apparent to those of skill in the art by describing in detail example embodiments with reference to the attached drawings in which.

DETAILED DESCRIPTION

Figure 1:
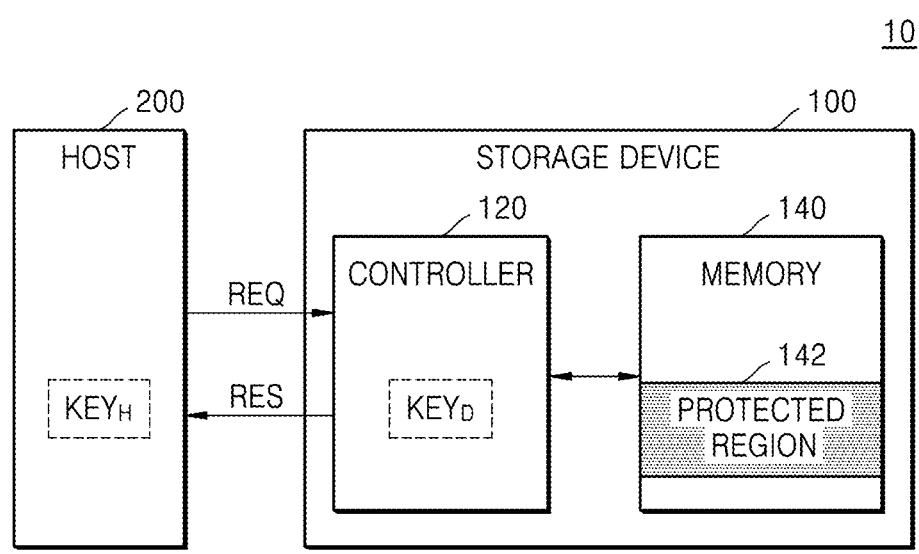
FIG. 1 is a block diagram of a system according to an example embodiment.

FIG. 1 is a block diagram of a system 10 according to an example embodiment. The system 10 may include a storage device 100 and a host 200, which communicate with each other. In an example embodiment, the system 10 may include a stationary system such as a desktop computer, a workstation, a server, a television, or a video game console; or a portable system such as a laptop computer, a tablet personal computer (PC), a mobile phone, an e-book, or a wearable device. In an example embodiment, the system 10 may be referred to as a storage system.

The host 200 may refer to a device that communicates with the storage device 100, and may be referred to as a host device. In an example embodiment, the host 200 may include at least one programmable device such as a central processing unit (CPU), a digital signal processor (DSP), a graphics processing unit (GPU), or a neural-network processing unit (NPU); a reconfigurable device such as a field programmable gate array (FPGA); or a device, such as an intellectual property (IP) core, which provides a fixed function. In an example embodiment, the host 200 may include a host controller that performs operations described hereinbelow with reference to the drawings. The host controller may include at least one programmable device configured to execute software, at least one reconfigurable device, and/or at least one device that provides a fixed function.

The host 200 may communicate with the storage device 100 based on an interface. In an example embodiment, the host 200 may communicate with the storage device 100 based on a serial advanced technology attachment (SATA) interface, a small computer small interface (SCSI), a peripheral component interconnect express (PCIe) interface, a universal serial bus (USB), a universal flash storage (UFS) interface, or an embedded multi-media card (eMMC) interface. Referring to FIG. 1, the host 200 may transmit a request REQ to the storage device 100 and receive a response RES from the storage device 100, based on the interface.

The storage device 100 may refer to a storage that includes a memory 140 for storing data. In an example embodiment, the storage device 100 may include an embedded device, which supports an embedded UFS (eUFS) or an eMMC, or may be detachably connected to the host 200 like a flash memory card, a compact flash (CF) card, a secure digital (SD) card, a micro-SD card, a mini-SD card, an extreme digital (xD) card, or a memory stick. Referring to FIG. 1, the storage device 100 may include a controller 120 and the memory 140.

The memory 140 may have a structure for storing data and may be referred to as a memory device. In an example embodiment, the memory 140 may include non-volatile memory such as flash memory or resistive random access memory (RRAM). In an example embodiment, the storage device 100 may include a buffer including volatile memory such as dynamic RAM (DRAM). In an example embodiment, the storage device 100 may include a buffer-less or DRAM-less storage, which uses a part of the memory 140 as a buffer. Referring to FIG. 1, the memory 140 may include a protected region 142. The protected region 142 may be managed by the controller 120, which is described below.

The controller 120 may control the memory 140, and may be referred to as a memory controller. Referring to FIG. 1, the controller 120 may receive the request REQ from the host 200, control the memory 140 based on the request REQ, and provide the response RES corresponding to the request REQ to the host 200. For example, when the host 200 requests a data write through the request REQ, the controller 120 may write data to the memory 140 based on an address included in the request REQ, and may provide the response RES, which indicates completion of the data write, to the host 200. When the host 200 requests a data read through the request REQ, the controller 120 may read data from the memory 140 based on an address included in the request REQ, and may provide the response RES including the data to the host 200.

The controller 120 may define the protected region 142 as a part of the memory 140. In an example embodiment, the protected region 142 may correspond to a replay protected memory block (RPMB) defined in UFS. The controller 120 may permit only authenticated access to the protected region 142. Accordingly, the host 200 may store data for which security is desired, i.e., secure data, in the protected region 142, and may read the secure data from the protected region 142. For this operation, the storage device 100 and the host 200 may share an authentication key with each other in advance, and may authenticate the request REQ and/or the response RES using the authentication key. For example, referring to FIG. 1, the controller 120 may use a device key $KEY_D$, and the device key $KEY_D$ may be stored in a space which is accessible by only the controller 120, e.g., a portion of the protected region 142. Similarly, the host 200 may use a host key $KEY_H$, and the host key $KEY_H$ may be stored in a space that is accessible by only the host 200 (or the host controller). Herein, operations performed by the controller 120 may be simply referred to as being performed by the storage device 100.

The device key $KEY_D$ and the host key $KEY_H$ may be respectively provisioned to the storage device 100 and the host 200. In an example embodiment, the device key $KEY_D$ and the host key $KEY_H$ may be respectively provisioned during the manufacture of the storage device 100 and during the manufacture of the host 200. In an example embodiment, the device key $KEY_D$ may be provisioned to the storage device 100 by the request REQ of the host 200, and the device key $KEY_D$ that has been provisioned may not be rewritten and read. In an example embodiment, the device key $KEY_D$ may be identical to the host key $KEY_H$.

Even though the storage device 100 and the host 200 authenticate access to the protected region 142 using the device key $KEY_D$ and the host key $KEY_H$, various attacks may be made on the system 10 to acquire and/or change data stored in the protected region 142 or to insert an error in access to the protected region 142. For example, as described with reference to FIGS. 3A and 3B below, an attack may be made to insert an error in access of writing data to the protected region 142. This attack may cause a serious error in the system 10.

As described herein, according to an example embodiment, to authenticate the request REQ received from the host 200, the storage device 100 may verify the request REQ based on the response RES that has been provided to the host 200 before, i.e., previously. To authenticate the response RES received from the storage device 100, the host 200 may verify the response RES based on the request REQ that has been provided to the storage device 100 before. Accordingly, a man-in-the-middle (MITM) attack may be effectively detected by the storage device 100 and the host 200, error insertion by the MITM attack may be prevented, and the security of the protected region 142 may be enhanced. In addition, a change in an interface between the storage device 100 and the host 200 may be unnecessary or minimized. Accordingly, the security of the protected region 142 may be efficiently and easily enhanced.

Figure 2:
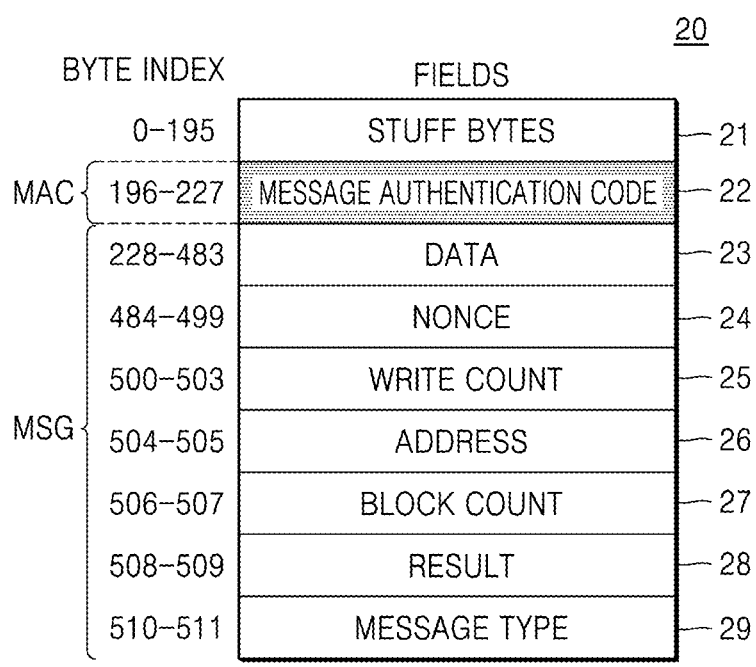
FIG. 2 is a diagram of a message data frame of a request and a response, according to an example embodiment.

FIG. 2 is a diagram of a message data frame 20 of the request REQ and the response RES according to an example embodiment. In the present example embodiment, the message data frame 20 of FIG. 2 refers to an RPMB message data frame of UFS. In an example embodiment, the request REQ and the response RES for access to the protected region 142 in FIG. 1 may have the message data frame 20 in common. Referring to FIG. 2, the message data frame 20 may include a plurality of fields. Hereinafter, FIG. 2 is described with reference to FIG. 1.

Referring to FIG. 2, the message data frame 20 may have 512 bytes in length. A stuff bytes field 21, which indicates the start of the message data frame 20 and has 196 bytes in length, may be at the front of the message data frame 20. The message data frame 20 may sequentially include, following the stuff bytes field 21, a message authentication code field 22, a data field 23, a nonce field 24, a write count field (or a write counter field) 25, an address field 26, a block count field 27, a result field 28, and a message type field 29. As described below, the data field 23, the nonce field 24, the write count field 25, the address field 26, the block count field 27, the result field 28, and the message type field 29 may be used together with an authentication key to generate the message authentication code field 22, and may be collectively referred to herein as a message MSG. Accordingly, each of the request REQ and the response RES may be referred to as including a message authentication code MAC and the message MSG.

The message authentication code field 22 may have 32 bytes in length, and may be included in each of the request REQ and the response RES. The message authentication code field 22 may have a value that is used to verify the message data frame 20, i.e., the request REQ or the response RES. In an example embodiment, the host 200 may generate the message authentication code MAC (which may be referred to as a host message authentication code herein) to be included in the request REQ based on the message MSG (which may be referred to as a host message herein) to be included in the request REQ and the host key $KEY_H$, and the storage device 100 may verify the message authentication code MAC (i.e., the host message authentication code) included in the request REQ based on the message MSG (i.e., the host message) included in the request REQ and the device key $KEY_D$. Similarly, the storage device 100 may generate the message authentication code MAC (which may be referred to as a device message authentication code herein) to be included in the response RES based on the message MSG (which may be referred to as a device message herein) to be included in the response RES and the device key $KEY_D$, and the host 200 may verify the message authentication code MAC (i.e., the device message authentication code) included in the response RES based on the message MSG (i.e., the device message) included in the response RES and the host key $KEY_H$. In an example embodiment, the message authentication code field 22 may be used to transmit an authentication key, which has a 32-byte length in an authentication key programming request (message type=0001h).

In an example embodiment, the message authentication code MAC may be generated from an authentication key and the message MSG based on a hash function, and may be referred to as a hash message authentication code (HMAC). For example, each of the storage device 100 and the host 200 may generate the message authentication code MAC from an authentication key and concatenation (i.e., bytes [228:511]) of the fields of the message MSG based on a hash function, such as Message-Digest algorithm 5 (MD5), Secure Hash Algorithm 1 (SHA-1), or SHA-256, and may include a hash engine that implements the hash function. Herein, the illustration and description of an authentication key used to generate the message authentication code MAC may be omitted.

The data field 23 may have a 256-byte length and may be included in each of the request REQ and the response RES. In an example embodiment, the data field 23 included in the request REQ may correspond to data to be written to the storage device 100, and the data field 23 included in the response RES may correspond to data read from the storage device 100.

The nonce field 24 may have a 16-byte length, may be included in each of the request REQ and the response RES, and may include a random number generated by the host 200.

The write count field 25 may have a 4-byte length, may be included in each of the request REQ and the response RES, and may include a value that results from counting write operations on the protected region 142. The nonce field 24 and the write count field 25 may be used together with the message authentication code field 22 to verify the message data frame 20.

The address field 26 may have a 2-byte length, may be included in each of the request REQ and the response RES, and may include a value that indicates a region to which the data field 23 is written in the protected region 142 or a region from which the data field 23 is read in the protected region 142.

The block count field 27 may have a 2-byte length, may be included in each of the request REQ and the response RES, and may include the number of 256-byte logical blocks requested to be read or programmed.

The result field 28 may have a 2-byte length, may be included in the response RES, and may include a value that indicates a result of an operation.

The message type field 29 may have a 2-byte length and may be included in each of the request REQ and the response RES. The message type field 29 included in the request REQ may be referred to as a request message type and may have a value that defines a request. In an example embodiment, the request message type may include a value that indicates one of an authenticate key programming request, a write count read request, an authenticated data write request, an authenticated data read request, a result read request, a secure write protection configuration block write request, and a secure write protection configuration block read request. A response message type may include a value that indicates one of an authenticate key programming response, a write count read response, an authenticated data write response, an authenticated data read response, a secure write protection configuration block write response, and a secure write protection configuration block read response.

Figure 3A:
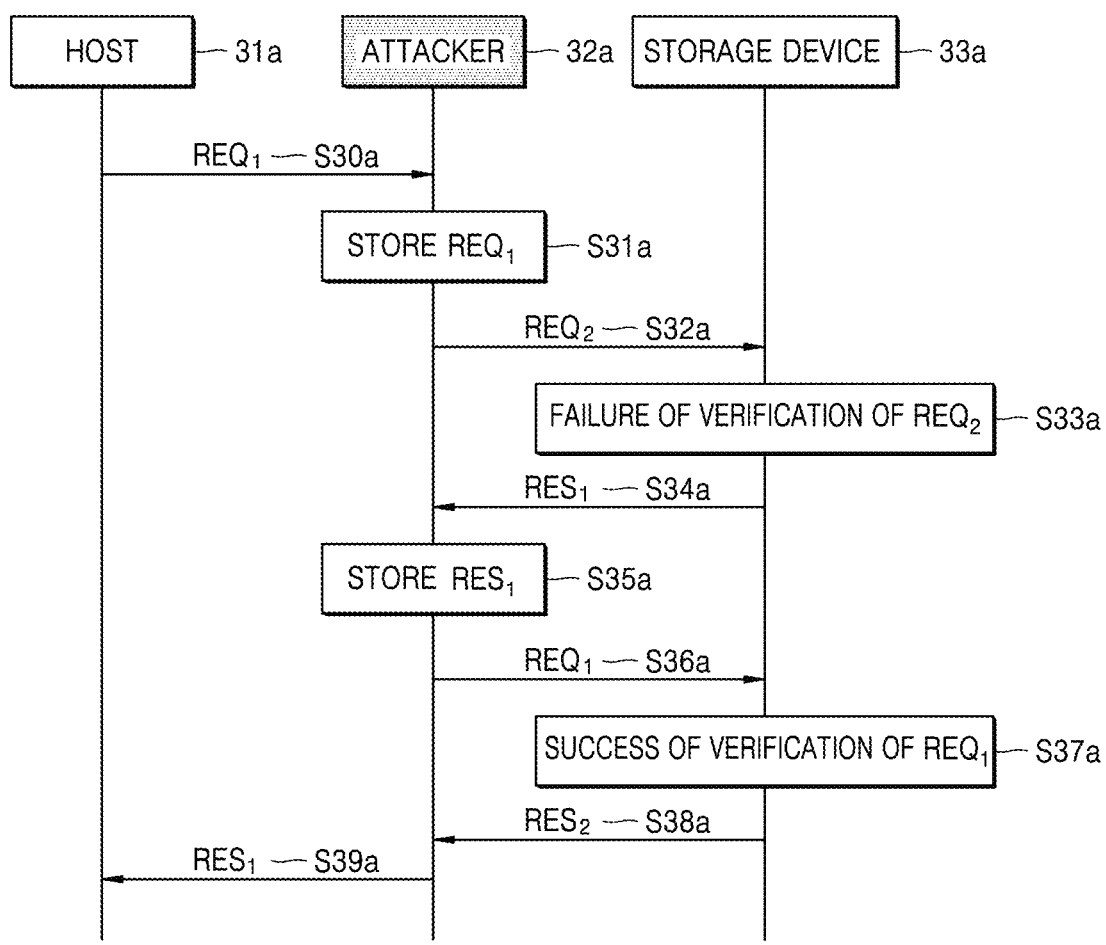
FIGS. 3A and 3B are message diagrams illustrating examples of attacks.
Figure 3B:
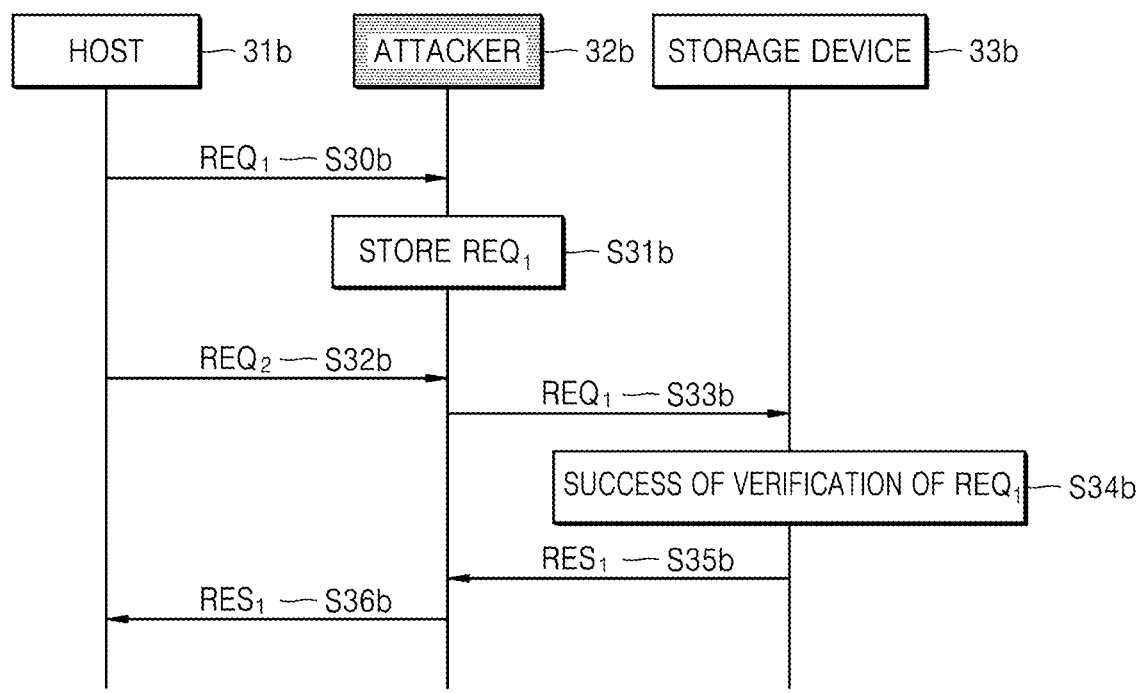

FIGS. 3A and 3B are message diagrams illustrating examples of attacks. In detail, FIGS. 3A and 3B illustrate examples of MITM attacks. An attacker 32a may be between a host 31a and a storage device 33a, referring to FIG. 3A. An attacker 32b may be between a host 31b and a storage device 33b, referring to FIG. 3B. It is assumed in FIGS. 3A and 3B that requests are write requests with respect to a protected region, and that a response is generated in response to a write request without a separate request (e.g., a result read request). Hereinafter, redundant descriptions will be omitted.

Referring to FIG. 3A, the host 31a may include at least one processor, which executes software including an operating system (OS) and an application executed on the OS. The OS may include a device driver, which provides an interface with the storage device 33a to an application. The attacker 32a may be included as software in the device driver or between the device driver and the storage device 33a, and may cause a relay attack as described below.

In operation S30a, the host 31a may issue a first write request $REQ_1$ and the attacker 32a may receive the first write request $REQ_1$. As described above with reference to FIG. 2, the first write request $REQ_1$ may include the message authentication code MAC and the message MSG, and the message type of the message MSG may have a value corresponding to a write request. In operation S31a, the attacker 32a may store the first write request $REQ_1$. The attacker 32a may store the first write request $REQ_1$, which is provided from the host 31a in operation S30a, to provide the first write request $REQ_1$ to the storage device 33a in operation S36a, which is described below.

In operation S32a, the attacker 32a may provide a second write request $REQ_2$ to the storage device 33a, and the storage device 33a may receive the second write request $REQ_2$. The attacker 32a may generate the second write request $REQ_2$ that is different from the first write request $REQ_1$ to obtain a response, i.e., a first response $RES_1$ in operation S34a, which indicates a failure of verification of write request, and may provide the second write request $REQ_2$ to the storage device 33a. In an example embodiment, the attacker 32a may generate the second write request $REQ_2$ by partially changing the message authentication code MAC and/or the message MSG, which are included in the first write request $REQ_1$.

In operation S33a, the storage device 33a may determine a failure of verification of the second write request $REQ_2$. In an example embodiment, the storage device 33a may compare a message verification code, which is generated based on the device key $KEY_D$ and the message MSG included in the second write request $REQ_2$, with the message authentication code MAC included in the second write request $REQ_2$, and identify that the second write request $REQ_2$ is not an authenticated request by a discrepancy between the message verification code and the message authentication code MAC.

In operation S34a, the storage device 33a may issue a first response $RES_1$, which indicates the failure of the verification of the second write request $REQ_2$, and the attacker 32a may receive the first response $RES_1$. The attacker 32a may store the first response $RES_1$ in operation S35a. The attacker 32a may store the first response $RES_1$, which is provided from the storage device 33a in operation S34a, to provide the first response $RES_1$ to the host 31a in operation S39a, which is described below.

In operation S36a, the attacker 32a may provide the first write request $REQ_1$ to the storage device 33a and the storage device 33a may receive the first write request $REQ_1$. The attacker 32a may provide the first write request $REQ_1$, which has been stored in operation S31a, to the storage device 33a as it is.

In operation S37a, the storage device 33a may determine a success of verification of the first write request $REQ_1$. Because the first write request $REQ_1$ provided from the attacker 32a in operation S36a is identical to that issued by the host 31a in operation S30a, the storage device 33a may identify the first write request $REQ_1$ as an authenticated request. Accordingly, data included in the first write request $REQ_1$ may be normally written to the storage device 33a.

In operation S38a, the storage device 33a may issue a second response $RES_2$, which indicates the success of the verification of the first write request $REQ_1$, and the attacker 32a may receive the second response $RES_2$ from the storage device 33a. In operation S39a, the attacker 32a may provide the first response $RES_1$ to the host 31a and the host 31a may receive the first response $RES_1$. The attacker 32a may provide the host 31a with the first response $RES_1$, which indicates the failure of the verification of the second write request $REQ_2$ and is stored in operation S35a, instead of the second response $RES_2$, which indicates the success of the verification of the first write request $REQ_1$. Accordingly, the host 31a may identify that a write operation requested by the first write request $REQ_1$ issued in operation S30a has failed while the storage device 33a may normally store the data, which is requested to be written by the first write request $REQ_1$. Consequently, because of the attacker 32a, the host 31a may identify a state that is different from the real state of the storage device 33a. Accordingly, an error may occur in a system including the host 31a and the storage device 33a.

Referring to FIG. 3B, in operation S30b, the host 31b may issue the first write request $REQ_1$ and the attacker 32b may receive the first write request $REQ_1$. In operation S31b, the attacker 32b may store the first write request $REQ_1$. The attacker 32b may store the first write request $REQ_1$, which is provided from the host 31b in operation S30b, to provide the first write request $REQ_1$ to the storage device 33b in operation S33b, which is described below. Referring to FIG. 3B, the attacker 32b may not provide any write request to the storage device 33b after storing the first write request $REQ_1$.

In operation S32b, the host 31b may issue the second write request $REQ_2$ and the attacker 32b may receive the second write request $REQ_2$. In an example embodiment, the host 31b may issue the second write request $REQ_2$, which includes second data that is different from first data included in the first write request $REQ_1$.

In operation S33b, the attacker 32b may provide the first write request $REQ_1$ to the storage device 33b. The attacker 32b may provide the storage device 33b with the first write request $REQ_1$, which has been stored in operation S31b, as it is, instead of the second write request $REQ_2$, which is received in operation S32b to write the second data.

In operation S34b, the storage device 33b may determine a success of verification of the first write request $REQ_1$. Because the first write request $REQ_1$ provided from the attacker 32b in operation S33b is identical to that issued by the host 31b in operation S30b, the storage device 33b may identify the first write request $REQ_1$ as an authenticated request. Accordingly, the first data included in the first write request $REQ_1$ may be normally written to the storage device 33b.

In operation S35b, the storage device 33b may issue the first response $RES_1$, which indicates the success of the verification of the first write request $REQ_1$, and the attacker 32b may receive the first response $RES_1$ from the storage device 33b. In operation S36b, the attacker 32b may provide the first response $RES_1$ to the host 31b and the host 31b may receive the first response $RES_1$. Accordingly, the host 31b may identify that a write operation of the second data requested by the second write request $REQ_2$ issued in operation S32b has succeeded while the storage device 33b may store the first data, which is requested to be written by the first write request $REQ_1$. Consequently, because of the attacker 32b, the host 31b may identify a state that is different from the real state of the storage device 33b. Accordingly, an error may occur in a system including the host 31b and the storage device 33b.

Figure 4:
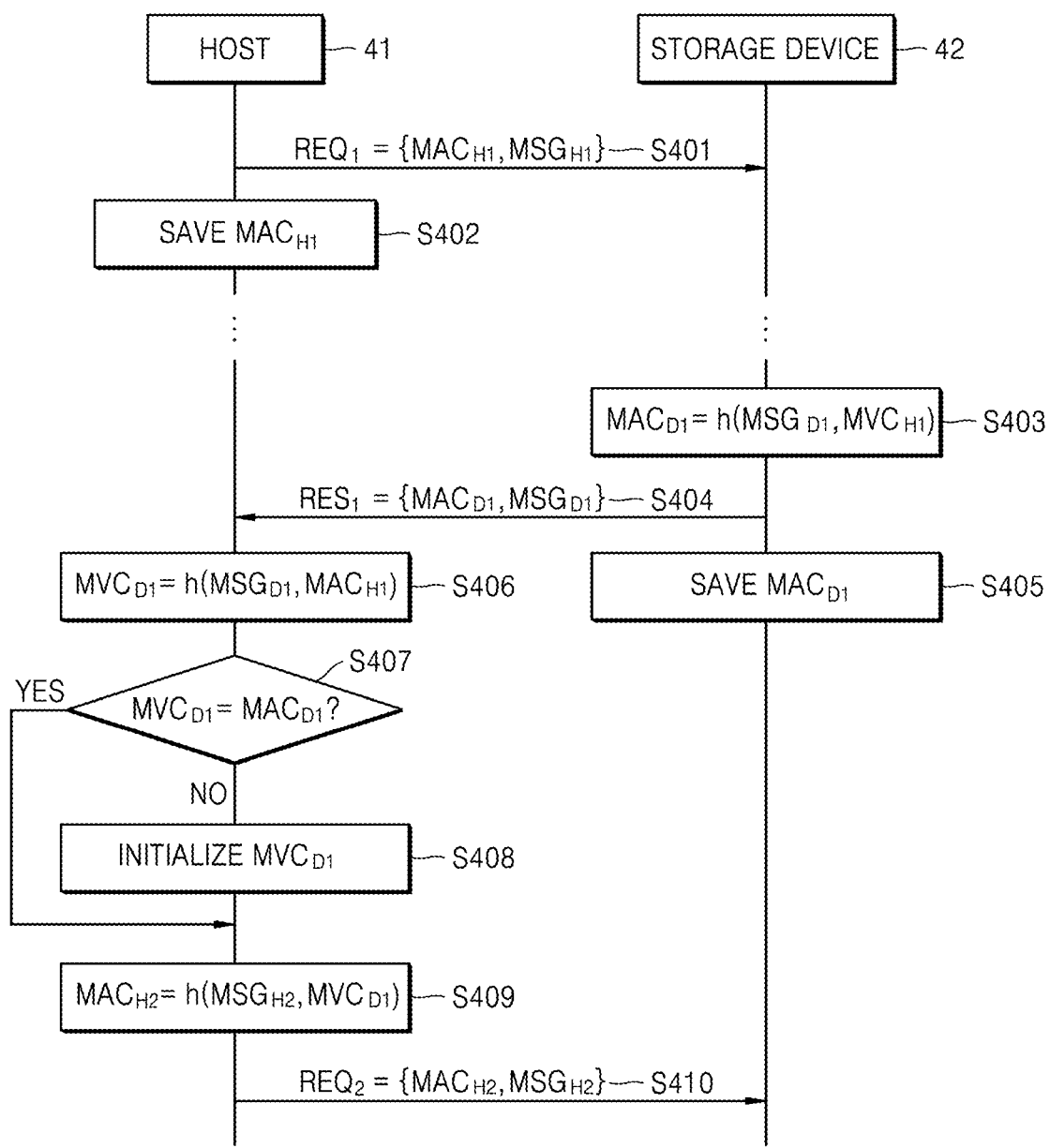
FIG. 4 is a message diagram of a method of writing data to a protected region, according to an example embodiment.

FIG. 4 is a message diagram of a method of writing data to a protected region, according to an example embodiment. In detail, the message diagram of FIG. 4 shows an example of an operation of verifying the response RES, wherein the operation is performed by a host 41. For convenience of illustration, an authentication key used for the generation of the message authentication code MAC is omitted from FIG. 4.

Referring to FIG. 4, in operation S401, the host 41 may provide a first request $REQ_1$ to a storage device 42, and the storage device 42 may receive the first request $REQ_1$. For example, a message type field among a plurality of fields included in the first request $REQ_1$ may have a value, e.g., 0003h, which corresponds to an authenticated data write request. Referring to FIG. 4, the first request $REQ_1$ may include a first host message authentication code $MAC_{H1}$ and a first host message $MSG_{H1}$. As described above with reference to FIG. 2, the host 41 may generate the first host message authentication code $MAC_{H1}$ based on the host key $KEY_H$ and the first host message $MSG_{H1}$.

In operation S402, the host 41 may save the first host message authentication code $MAC_{H1}$. As described below, the host 41 may use the first host message authentication code $MAC_{H1}$ to verify the first response $RES_1$ received from the storage device 42.

In operation S403, the storage device 42 may generate a first device message authentication code $MAC_{D1}$. To provide a response, i.e., the first response $RES_1$, which includes a first device message $MSG_{D1}$, the storage device 42 may generate the first device message authentication code $MAC_{D1}$ based on the first device message $MSG_{D1}$ and a first host message verification code $MVC_{H1}$, referring to FIG. 4. When the verification of the first request $REQ_1$ succeeds, that is, when the first request $REQ_1$ that is authenticated is received, the first host message verification code $MVC_{H1}$ may be identical to the first host message authentication code $MAC_{H1}$. Accordingly, the first device message authentication code $MAC_{D1}$ may depend on the first host message authentication code $MAC_{H1}$, which is received from the host 41 in operation S401. Consequently, a message authentication code chain may be formed in the storage device 42, and the storage device 42 may verify the request REQ and generate the response RES based on the message authentication code chain. Similarly, as described below, a message authentication code chain may be formed in the host 41, and the host 41 may verify a response and generate a request based on the message authentication code chain.

In operation S404, the storage device 42 may provide the first response $RES_1$ to the host 41, and the host 41 may receive the first response $RES_1$. For example, a message type field among a plurality of fields included in the first response $RES_1$ may have a value, e.g., 0300h, which corresponds to an authenticated data write response. Referring to FIG. 4, the first response $RES_1$ may include the first device message authentication code $MAC_{D1}$ and the first device message $MSG_{D1}$. In an example embodiment, the first request $REQ_1$ may correspond to a write count read request, and the first device message $MSG_{D1}$ of the first response $RES_1$ may include a current write count (or a current write counter) of the storage device 42.

In operation S405, the storage device 42 may save the first device message authentication code $MAC_{D1}$. The storage device 42 may use the first device message authentication code $MAC_{D1}$ to verify a request, e.g., a second request $REQ_2$, which is received from the host 41.

In operation S406, the host 41 may generate a first device message verification code $MVC_{D1}$. To verify the first response $RES_1$, the host 41 may generate the first device message verification code $MVC_{D1}$ based on the first device message $MSG_{D1}$ and the first host message authentication code $MAC_{H1}$, referring to FIG. 4.

In operation S407, the host 41 may compare the first device message verification code $MVC_{D1}$ with the first device message authentication code $MAC_{D1}$. When the first request $REQ_1$ has been normally transmitted to the storage device 42 in operation S401, the first device message verification code $MVC_{D1}$ may be identical to the first device message authentication code $MAC_{D1}$. Otherwise, when the first request $REQ_1$ has not been normally transmitted to the storage device 42, the first host message verification code $MVC_{H1}$, which has been used to generate the first device message authentication code $MAC_{D1}$ in operation S403, may be different from the first host message authentication code $MAC_{H1}$, which has been saved in operation S402. Accordingly, the first device message verification code $MVC_{D1}$ may be different from the first device message authentication code $MAC_{D1}$. Referring to FIG. 4, when the first device message verification code $MVC_{D1}$ is identical to the first device message authentication code $MAC_{D1}$, operation S409 may be performed subsequently. Otherwise, when the first device message verification code $MVC_{D1}$ is different from the first device message authentication code $MAC_{D1}$, operations S408 and S409 may be performed subsequently.

In operation S408, the host 41 may initialize the first device message verification code $MVC_{D1}$. In an example embodiment, the host 41 may set the first device message verification code $MVC_{D1}$ to a predefined value (e.g., zero). As described below, the first device message verification code $MVC_{D1}$ may be used to generate a second host message authentication code $MAC_{H2}$. Accordingly, the host 41 may initialize the message authentication code chain by initializing the first device message verification code $MVC_{D1}$ when the verification of the first response $RES_1$ fails.

In operation S409, the host 41 may generate the second host message authentication code $MAC_{H2}$. Referring to FIG. 4, the host 41 may generate the second host message authentication code $MAC_{H2}$ based on a second host message $MSG_{H2}$ and the first device message verification code $MVC_{D1}$. When the first device message verification code $MVC_{D1}$ is identical to the first device message authentication code $MAC_{D1}$ in operation S407, the second host message authentication code $MAC_{H2}$ may depend on the first device message authentication code $MAC_{D1}$ that is included in the first response $RES_1$. Accordingly, the message authentication code chain may be maintained. Otherwise, when the first device message verification code $MVC_{D1}$ is not identical to the first device message authentication code $MAC_{D1}$ in operation S407, the second host message authentication code $MAC_{H2}$ may depend on the first device message verification code $MVC_{D1}$ that has been initialized in operation S408 and may be independent of the first device message authentication code $MAC_{D1}$. Accordingly, the message authentication code chain may be initialized.

In operation S410, the host 41 may provide the second request $REQ_2$ to the storage device 42. Referring to FIG. 4, the second request $REQ_2$ may include the second host message authentication code $MAC_{H2}$ and a second host message $MSG_{H2}$. For example, a message type field among a plurality of fields included in the second request $REQ_2$ may have a value, e.g., 0003h, which corresponds to an authenticated data write request. In an example embodiment, when the message authentication code chain is initialized, the host 41 may generate the second host message $MSG_{H2}$, which includes information indicating the initialization of the message authentication code chain, and provide the second host message $MSG_{H2}$ to the storage device 42 through the second request $REQ_2$.

Figure 5:
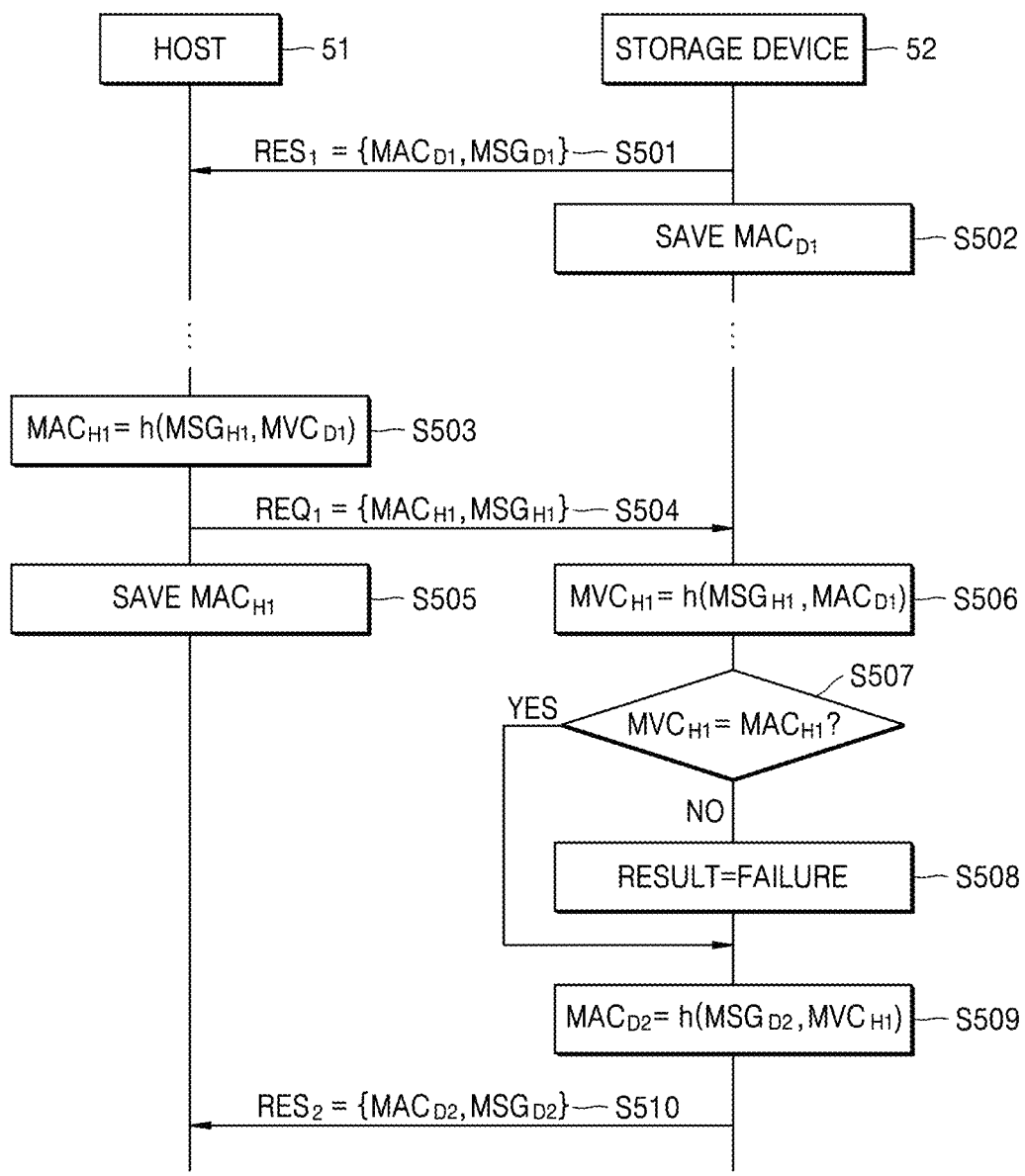
FIG. 5 is a message diagram of a method of writing data to a protected region, according to an example embodiment.

FIG. 5 is a message diagram of a method of writing data to a protected region, according to an example embodiment. In detail, the message diagram of FIG. 5 shows an example of an operation of verifying the request REQ, wherein the operation is performed by a storage device 52. For convenience of illustration, an authentication key used for the generation of the message authentication code MAC is omitted from FIG. 5. Redundant descriptions given above with reference to FIG. 4 will be omitted.

Referring to FIG. 5, in operation S501, the storage device 52 may provide the first response $RES_1$ to a host 51, and the host 51 may receive the first response $RES_1$. For example, a message type field among a plurality of fields included in the first response $RES_1$ may have a value, e.g., 0300h, which corresponds to an authenticated data write response. Referring to FIG. 5, the first response $RES_1$ may include the first device message authentication code $MAC_{D1}$ and the first device message $MSG_{D1}$. As described above with reference to FIG. 2, the storage device 52 may generate the first device message authentication code $MAC_{D1}$ based on the device key $KEY_D$ and the first device message $MSG_{D1}$.

In operation S502, the storage device 52 may save the first device message authentication code $MAC_{D1}$. As described below, the storage device 52 may use the first device message authentication code $MAC_{D1}$ to verify the first request $REQ_1$ received from the host 51.

In operation S503, the host 51 may generate the first host message authentication code $MAC_{H1}$. To provide a request, i.e., the first request $REQ_1$, which includes the first host message $MSG_{H1}$, to the storage device 52, the host 51 may generate the first host message authentication code $MAC_{H1}$ based on the first host message $MSG_{H1}$ and the first device message verification code $MVC_{D1}$, referring to FIG. 5. The first host message authentication code $MAC_{H1}$ may depend on the first device message authentication code $MAC_{D1}$ that is included in the first response $RES_1$, which has been received from the storage device 52 in operation S501.

In operation S504, the host 51 may provide the first request $REQ_1$ to the storage device 52, and the storage device 52 may receive the first request $REQ_1$. For example, a message type field among a plurality of fields included in the first request $REQ_1$ may have a value, e.g., 0003h, which corresponds to an authenticated data write request. Referring to FIG. 5, the first request $REQ_1$ may include the first host message authentication code $MAC_{H1}$ and the first host message $MSG_{H1}$. In an example embodiment, the first device message $MSG_{D1}$ of the first response $RES_1$ may include a current write count, and the first host message $MSG_{H1}$ of the first request $REQ_1$ may include the current write count.

In operation S505, the host 51 may save the first host message authentication code $MAC_{H1}$. The host 51 may use the first host message authentication code $MAC_{H1}$ to verify a response, e.g., the second response $RES_2$, which is received from the storage device 52.

In operation S506, the storage device 52 may generate the first host message verification code $MVC_{H1}$. To verify the first request $REQ_1$, the storage device 52 may generate the first host message verification code $MVC_{H1}$ based on the first host message $MSG_{H1}$ and the first device message authentication code $MAC_{D1}$, referring to FIG. 5.

In operation S507, the storage device 52 may compare the first host message verification code $MVC_{H1}$ with the first host message authentication code $MAC_{H1}$. When the first response $RES_1$ has been normally transmitted to the host 51 in operation S501, the first host message verification code $MVC_{H1}$ may be identical to the first host message authentication code $MAC_{H1}$. Otherwise, when the first response $RES_1$ has not been normally transmitted to the host 51, the first device message verification code $MVC_{D1}$, which has been used to generate the first host message authentication code $MAC_{H1}$ in operation S503, may be different from the first device message authentication code $MAC_{D1}$, which has been saved in operation S502. Accordingly, the first host message verification code $MVC_{H1}$ may be different from the first host message authentication code $MAC_{H1}$. Referring to FIG. 5, when the first host message verification code $MVC_{H1}$ is identical to the first host message authentication code $MAC_{H1}$, operation S509 may be performed subsequently. Otherwise, when the first host message verification code $MVC_{H1}$ is different from the first host message authentication code $MAC_{H1}$, operations S508 and S509 may be performed subsequently.

In operation S508, the storage device 52 may determine a failure of the verification of the first request $REQ_1$. Referring to FIG. 5, the storage device 52 may set a value, which corresponds to the failure, in the result field of a second device message $MSG_{D2}$, which is included in the second response $RES_2$.

In operation S509, the storage device 52 may generate a second device message authentication code $MAC_{D2}$. Referring to FIG. 5, the storage device 52 may generate the second device message authentication code $MAC_{D2}$ based on the second device message $MSG_{D2}$ and the first host message verification code $MVC_{H1}$. In an example embodiment, differently from FIG. 5, the storage device 52 may generate the second device message authentication code $MAC_{D2}$ based on the first host message authentication code $MAC_{H1}$ instead of the first host message verification code $MVC_{H1}$.

In operation S510, the storage device 52 may provide the second response $RES_2$ to the host 51. For example, a message type field among a plurality of fields included in the second response $RES_2$ may have a value, e.g., 0300h, which corresponds to an authenticated data write response. Referring to FIG. 5, the second response $RES_2$ may include the second device message authentication code $MAC_{D2}$ and the second device message $MSG_{D2}$. When the first host message verification code $MVC_{H1}$ is identical to the first host message authentication code $MAC_{H1}$ in operation S507, the second device message $MSG_{D2}$ may include a result field that is set to a value corresponding to a success. Otherwise, when the first host message verification code $MVC_{H1}$ is different from the first host message authentication code $MAC_{H1}$ in operation S507, the second device message $MSG_{D2}$ may include a result field that is set to a value corresponding to a failure.

Figure 6:
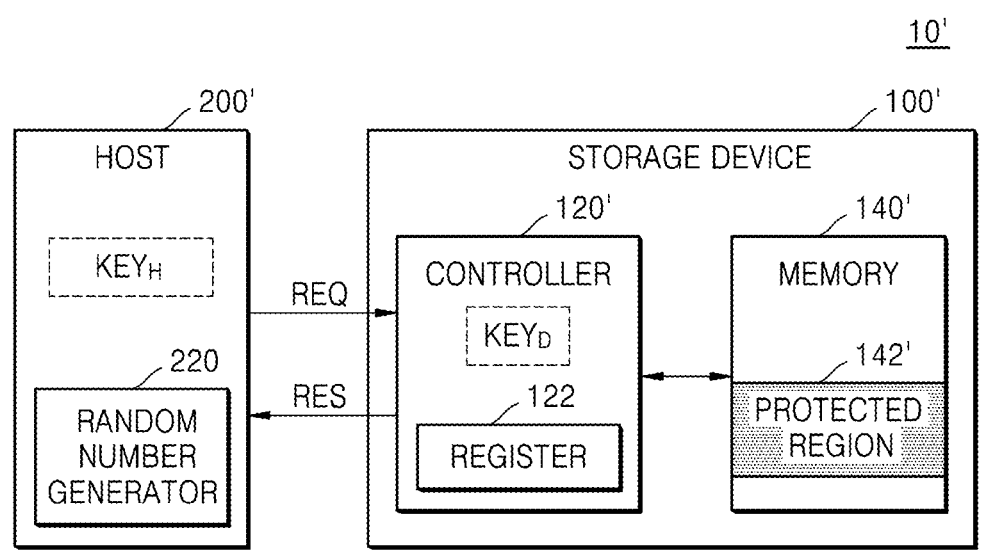
FIG. 6 is a block diagram of a system according to an example embodiment.

FIG. 6 is a block diagram of a system 10' according to an example embodiment. Similarly to the system 10 of FIG. 1, the system 10' may include a storage device 100' and a host 200'. The storage device 100' may include a controller 120' and a memory 140'. The memory 140' may include a protected region 142'. For authenticated access to the protected region 142', the controller 120' may use the device key $KEY_D$ and the host 200' may use the host key $KEY_H$.

Hereinafter, redundant descriptions given above with reference to FIG. 1 will be omitted.

Referring to FIG. 6, the host 200' may include a random number generator 220. In an example embodiment, the host 200' may generate a nonce (described above with reference to FIG. 2) based on a random number generated by the random number generator 220, and may provide the request REQ including the nonce to the storage device 100'. Accordingly, the message MSG of the request REQ may include a nonce having a unique value. The controller 120' may extract the nonce from the message MSG of the request REQ, and may provide the response RES, which includes a message authentication code generated based on the nonce, to the host 200'. The host 200' may generate a message verification code based on the nonce, and may verify the response RES based on the message verification code.

In an example embodiment, the controller 120' may provide the response RES, which includes a nonce extracted from the message MSG of the request REQ, to the host 200'. The host 200' may extract a nonce from the message MSG of the response RES. When the extracted nonce is different from a nonce included in the message MSG of the request REQ, the host 200' may identify that the response RES does not correspond to the request REQ and is thus not authenticated.

The controller 120' may include a register 122. The register 122 may store a write count. In an example embodiment, the controller 120' may count a write operation, which is performed on the protected region 142' in response to a write request to the protected region 142'. The host 200' may provide the request REQ (i.e., a write count read request) to read a current write count to the storage device 100', and the controller 120' may read the write count stored in the register 122 and provide the response RES including the write count to the host 200'. The host 200' may provide the request REQ to write data to the storage device 100', and the request REQ may include a write count. When the write count included in the request REQ is different from a current write count, i.e., a write count stored in the register 122, the controller 120' may identify the request REQ as an unauthenticated request.

Figure 7:
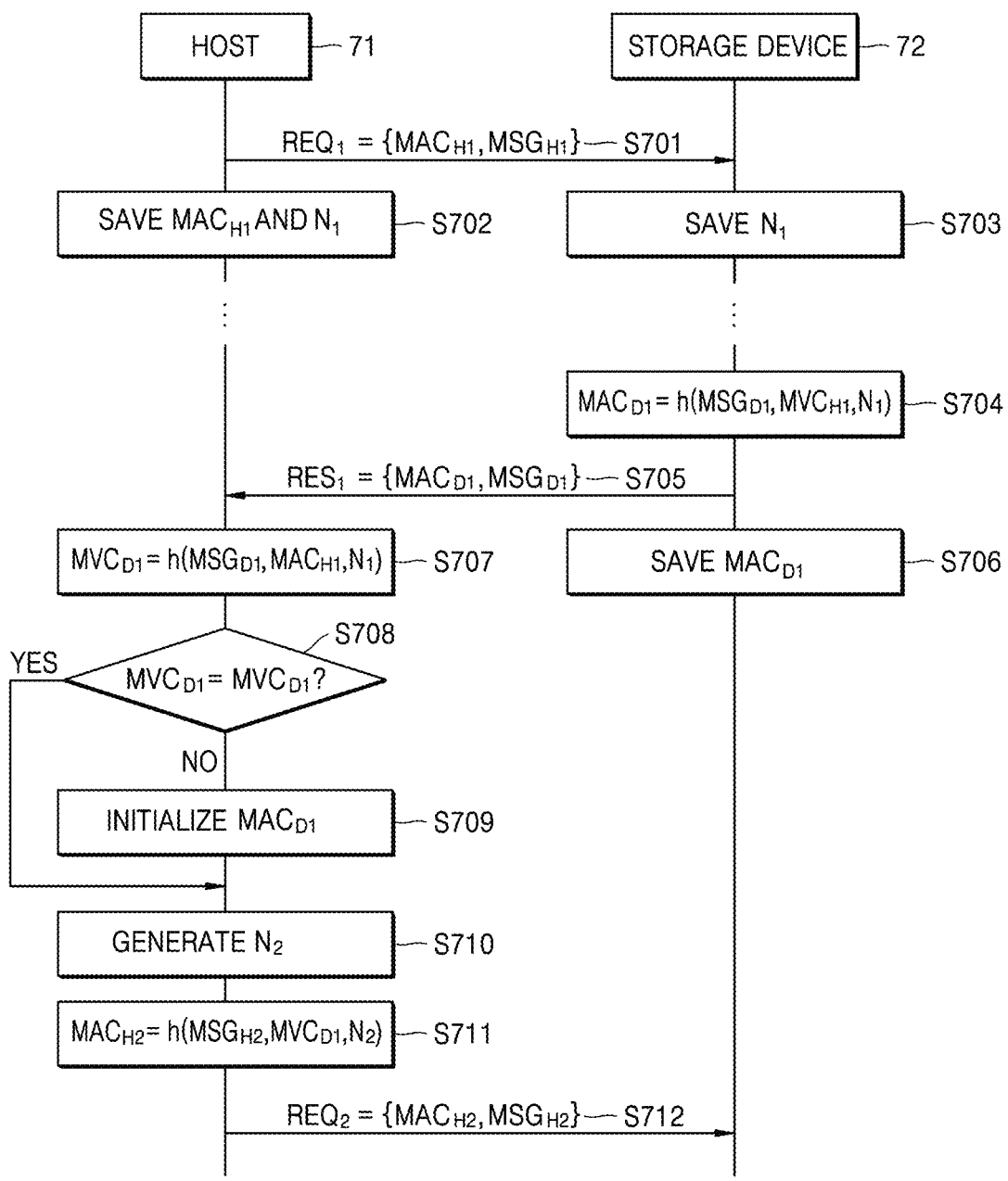
FIG. 7 is a message diagram of a method of writing data to a protected region, according to an example embodiment.

FIG. 7 is a message diagram of a method of writing data to a protected region, according to an example embodiment. In detail, the message diagram of FIG. 7 shows an example of an operation of verifying the response RES, wherein the operation is performed by a host 71. Compared to the host 41 in FIG. 4, the host 71 in FIG. 7 may use a nonce in addition to a message authentication code chain to generate the request REQ and verify the response RES. Redundant descriptions given above with reference to FIG. 4 will be omitted.

Referring to FIG. 7, in operation S701, the host 71 may provide the first request $REQ_1$ to a storage device 72, and the storage device 72 may receive the first request $REQ_1$. For example, a message type field among a plurality of fields included in the first request $REQ_1$ may have a value, e.g., 0003h, which corresponds to an authenticated data write request. Referring to FIG. 7, the first request $REQ_1$ may include the first host message authentication code $MAC_{H1}$ and the first host message $MSG_{H1}$. The first host message $MSG_{H1}$ may include a first nonce $N_1$. For example, as described above with reference to FIG. 6, the host 71 may include a random number generator and generate the first nonce $N_1$ based on a random number generated by the random number generator. As described above with reference to FIG. 2, the host 71 may generate the first host message authentication code $MAC_{H1}$ based on the host key $KEY_H$ and the first host message $MSG_{H1}$.

In operation S702, the host 71 may save the first host message authentication code $MAC_{H1}$ and the first nonce $N_1$. As described below, the host 71 may use the first host message authentication code $MAC_{H1}$ and the first nonce $N_1$ to verify the first response $RES_1$ received from the storage device 72. In operation S703, the storage device 72 may save the first nonce $N_1$. The storage device 72 may extract the first nonce $N_1$ from the first host message $MSG_{H1}$ and, as described below, may use the first nonce $N_1$ to generate the first device message authentication code $MAC_{D1}$.

In operation S704, the storage device 72 may generate the first device message authentication code $MAC_{D1}$. To provide a response, i.e., the first response $RES_1$, which includes the first device message $MSG_{D1}$, the storage device 72 may generate the first device message authentication code $MAC_{D1}$ based on the first device message $MSG_{D1}$, the first host message verification code $MVC_{H1}$, and the first nonce $N_1$. The first device message authentication code $MAC_{D1}$ may depend on the first host message authentication code $MAC_{H1}$ and the first nonce $N_1$, which are included in the first request $REQ_1$ that has been received from the host 71 and authenticated.

In operation S705, the storage device 72 may provide the first response $RES_1$ to the host 71, and the host 71 may receive the first response $RES_1$. For example, a message type field among a plurality of fields included in the first response $RES_1$ may have a value, e.g., 0300h, which corresponds to an authenticated data write response. Referring to FIG. 4, the first response $RES_1$ may include the first device message authentication code $MAC_{D1}$ and the first device message $MSG_{D1}$.

In operation S706, the storage device 72 may save the first device message authentication code $MAC_{D1}$. The storage device 72 may use the first device message authentication code $MAC_{D1}$ to verify a request, e.g., the second request $REQ_2$, which is received from the host 71.

In operation S707, the host 71 may generate the first device message verification code $MVC_{D1}$. To verify the first response $RES_1$, the host 71 may generate the first device message verification code $MVC_{D1}$ based on the first host message authentication code $MAC_{H1}$ and the first nonce $N_1$, which has been saved in operation S702, as well as the first device message $MSG_{D1}$.

In operation S708, the host 71 may compare the first device message verification code $MVC_{D1}$ with the first device message authentication code $MAC_{D1}$. When the first request $REQ_1$ has been normally transmitted to the storage device 72 in operation S701, the first device message verification code $MVC_{D1}$ may be identical to the first device message authentication code $MAC_{D1}$. Otherwise, when the first request $REQ_1$ has not been normally transmitted to the storage device 72, the first host message verification code $MVC_{H1}$ and/or the first nonce $N_1$, which have been used to generate the first device message authentication code $MAC_{D1}$ in operation S704, may be different from the first host message authentication code $MAC_{H1}$ and/or the first nonce $N_1$, which have been saved in operation S702. Accordingly, the first device message verification code $MVC_{D1}$ may be different from the first device message authentication code $MAC_{D1}$. Referring to FIG. 7, when the first device message verification code $MVC_{D1}$ is identical to the first device message authentication code $MAC_{D1}$, operation S710 may be performed subsequently. Otherwise, when the first device message verification code $MVC_{D1}$ is different from the first device message authentication code $MAC_{D1}$, operations S709 and S710 may be performed subsequently.

In operation S709, the host 71 may initialize the first device message verification code $MVC_{D1}$. In an example embodiment, the host 71 may set the first device message verification code $MVC_{D1}$ to a predefined value (e.g., zero). Accordingly, the host 71 may initialize the message authentication code chain when the verification of the first response $RES_1$ fails.

In operation S710, the host 71 may generate a second nonce $N_2$. In an example embodiment, the host 71 may generate the second nonce $N_2$ based on a random number generated by the random number generator. Accordingly, the second nonce $N_2$ may be different from the first nonce $N_1$ and may not be predicted from the first nonce $N_1$.

In operation S711, the host 71 may generate the second host message authentication code $MAC_{H2}$. Referring to FIG. 7, the host 71 may generate the second host message authentication code $MAC_{H2}$ based on the second host message $MSG_{H2}$, the first device message verification code $MVC_{D1}$, and the second nonce $N_2$. Regardless of whether the first device message verification code $MVC_{D1}$ is identical to the first device message authentication code $MAC_{D1}$ in operation S708, that is, regardless of whether the message authentication code chain is initialized, the second host message authentication code $MAC_{H2}$ may depend on the second nonce $N_2$.

In operation S712, the host 71 may provide the second request $REQ_2$ to the storage device 72. For example, a message type field among a plurality of fields included in the second request $REQ_2$ may have a value, e.g., 0003h, which corresponds to an authenticated data write request. Referring to FIG. 7, the second request $REQ_2$ may include the second host message authentication code $MAC_{H2}$ and a second host message $MSG_{H2}$. In an example embodiment, when the message authentication code chain is initialized, the host 71 may generate the second host message $MSG_{H2}$, which includes information indicating the initialization of the message authentication code chain, and provide the second host message $MSG_{H2}$ to the storage device 72 through the second request $REQ_2$.

Figure 8:
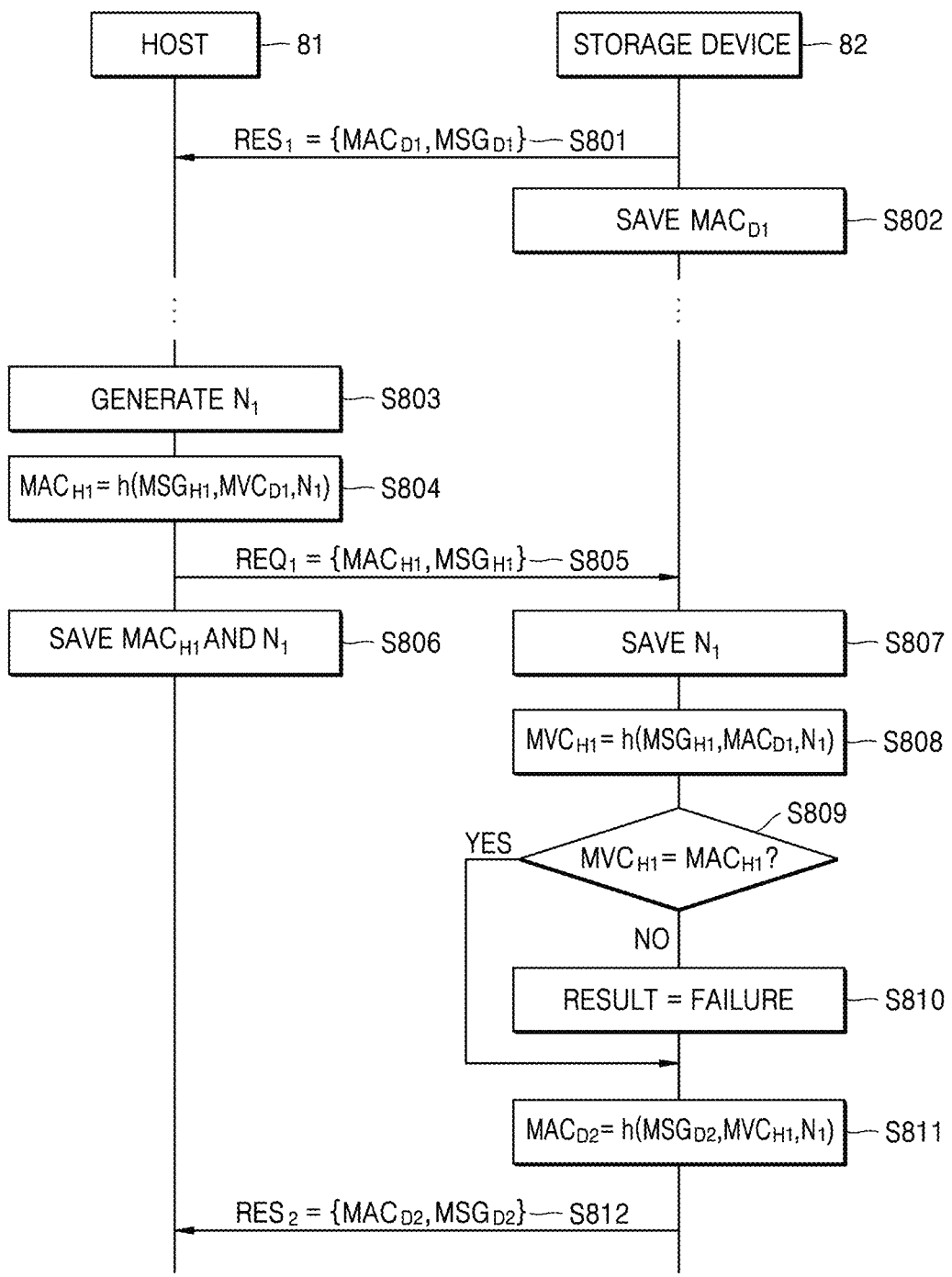
FIG. 8 is a message diagram of a method of writing data to a protected region, according to an example embodiment.

FIG. 8 is a message diagram of a method of writing data to a protected region, according to an example embodiment. In detail, the message diagram of FIG. 8 shows an example of an operation of verifying the request REQ, wherein the operation is performed by a storage device 82. Compared to the storage device 52 in FIG. 5, the storage device 82 in FIG. 8 may use a nonce in addition to a message authentication code chain to generate the response RES and verify the request REQ. Redundant descriptions given above with reference to FIG. 5 will be omitted.

Referring to FIG. 8, in operation S801, the storage device 82 may provide the first response $RES_1$ to a host 81, and the host 81 may receive the first response $RES_1$. For example, a message type field among a plurality of fields included in the first response $RES_1$ may have a value, e.g., 0300h, which corresponds to an authenticated data write response. Referring to FIG. 8, the first response $RES_1$ may include the first device message authentication code $MAC_{D1}$ and the first device message $MSG_{D1}$. As described above with reference to FIG. 2, the storage device 82 may generate the first device message authentication code $MAC_{D1}$ based on the device key $KEY_D$ and the first device message $MSG_{D1}$.

In operation S802, the storage device 82 may save the first device message authentication code $MAC_{D1}$. As described below, the storage device 82 may use the first device message authentication code $MAC_{D1}$ to verify the first request $REQ_1$ received from the host 81.

In operation S803, the host 81 may generate the first nonce $N_1$. In an example embodiment, the host 81 may generate the first nonce $N_1$ based on a random number generated by a random number generator. Accordingly, the first nonce $N_1$ may be different from a nonce that has been generated before.

In operation S804, the host 81 may generate the first host message authentication code $MAC_{H1}$. To provide a request, i.e., the first request $REQ_1$, which includes the first host message $MSG_{H1}$, to the storage device 82, the host 81 may generate the first host message authentication code $MAC_{H1}$ based on the first host message $MSG_{H1}$, the first device message verification code $MVC_{D1}$, and the first nonce $N_1$. The first host message authentication code $MAC_{H1}$ may depend on the first nonce $N_1$ as well as the first device message authentication code $MAC_{D1}$ that is included in the first response $RES_1$, which has been received from the storage device 82 in operation S801.

In operation S805, the host 81 may provide the first request $REQ_1$ to the storage device 82, and the storage device 82 may receive the first request $REQ_1$. For example, a message type field among a plurality of fields included in the first request $REQ_1$ may have a value, e.g., 0003h, which corresponds to an authenticated data write request. Referring to FIG. 8, the first request $REQ_1$ may include the first host message authentication code $MAC_{H1}$ and the first host message $MSG_{H1}$. In an example embodiment, the first device message $MSG_{D1}$ of the first response $RES_1$ may include a current write count, and the first host message $MSG_{H1}$ of the first request $REQ_1$ may include the current write count.

In operation S806, the host 81 may save the first host message authentication code $MAC_{H1}$ and the first nonce $N_1$. The host 81 may use the first host message authentication code $MAC_{H1}$ and the first nonce $N_1$ to verify a response, e.g., the second response $RES_2$, which is received from the storage device 82. In operation S807, the storage device 82 may save the first nonce $N_1$. The storage device 82 may extract the first nonce $N_1$ from the first host message $MSG_{H1}$ and, as described below, use the first nonce $N_1$ to verify the first request $REQ_1$ and to generate the second device message authentication code $MAC_{D2}$.

In operation S808, the storage device 82 may generate the first host message verification code $MVC_{H1}$. To verify the first request $REQ_1$, the storage device 82 may generate the first host message verification code $MVC_{H1}$ based on the first host message $MSG_{H1}$, the first device message authentication code $MAC_{D1}$, and the first nonce $N_1$.

In operation S809, the storage device 82 may compare the first host message verification code $MVC_{H1}$ with the first host message authentication code $MAC_{H1}$. When the first response $RES_1$ has been normally transmitted to the host 81 in operation S801, the first host message verification code $MVC_{H1}$ may be identical to the first host message authentication code $MAC_{H1}$. Otherwise, when the first response $RES_1$ has not been normally transmitted to the host 81, the first device message verification code $MVC_{D1}$, which has been used to generate the first host message authentication code $MAC_{H1}$ in operation S804, may be different from the first device message authentication code $MAC_{D1}$, which has been saved in operation S802. Accordingly, the first host message verification code $MVC_{H1}$ may be different from the first host message authentication code $MAC_{H1}$. Referring to FIG. 8, when the first host message verification code $MVC_{H1}$ is identical to the first host message authentication code $MAC_{H1}$, operation S811 may be performed subsequently. Otherwise, when the first host message verification code $MVC_{H1}$ is different from the first host message authentication code $MAC_{H1}$, operations S810 and S811 may be performed subsequently.

In operation S810, the storage device 82 may determine a failure of the verification of the first request $REQ_1$. Referring to FIG. 8, the storage device 82 may set a value, which corresponds to the failure, in the result field of the second device message $MSG_{D2}$, which is included in the second response $RES_2$.

In operation S811, the storage device 82 may generate the second device message authentication code $MAC_{D2}$. Referring to FIG. 8, the storage device 82 may generate the second device message authentication code $MAC_{D2}$ based on the second device message $MSG_{D2}$, the first host message verification code $MVC_{H1}$, and the first nonce $N_1$. In an example embodiment, differently from FIG. 8, the storage device 82 may generate the second device message authentication code $MAC_{D2}$ based on the first host message authentication code $MAC_{H1}$ instead of the first host message verification code $MVC_{H1}$.

In operation S812, the storage device 82 may provide the second response $RES_2$ to the host 81. For example, a message type field among a plurality of fields included in the second response $RES_2$ may have a value, e.g., 0300h, which corresponds to an authenticated data write response.

Referring to FIG. 8, the second response $RES_2$ may include the second device message authentication code $MAC_{D2}$ and the second device message $MSG_{D2}$. When the first host message verification code $MVC_{H1}$ is identical to the first host message authentication code $MAC_{H1}$ in operation S809, the second device message $MSG_{D2}$ may include a result field that is set to a value corresponding to a success. Otherwise, when the first host message verification code $MVC_{H1}$ is different from the first host message authentication code $MAC_{H1}$ in operation S809, the second device message $MSG_{D2}$ may include a result field that is set to a value corresponding to a failure.

Figure 9A:
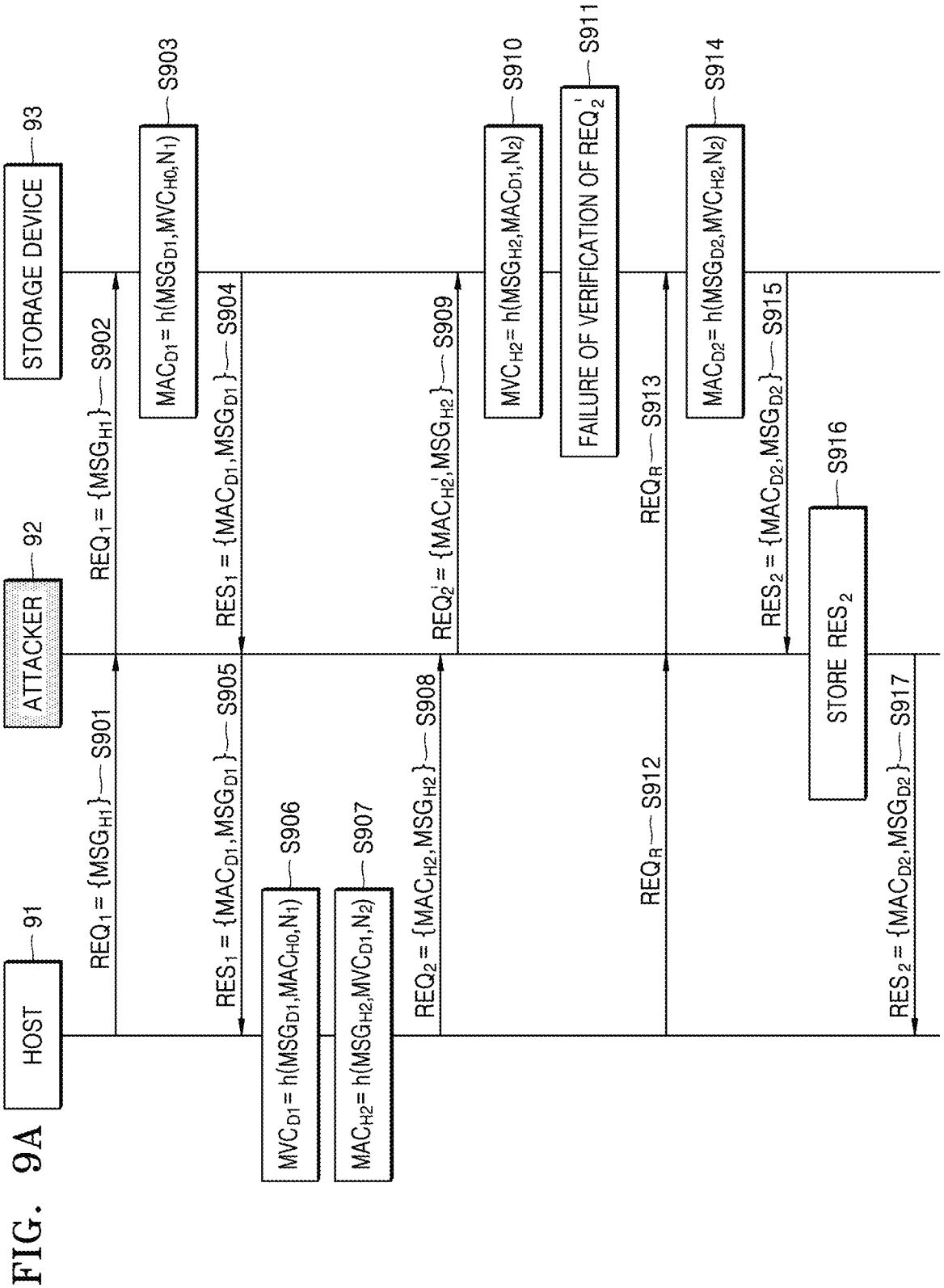
FIGS. 9A and 9B are message diagrams of a method of writing data to a protected region, according to an example embodiment.
Figure 9B:
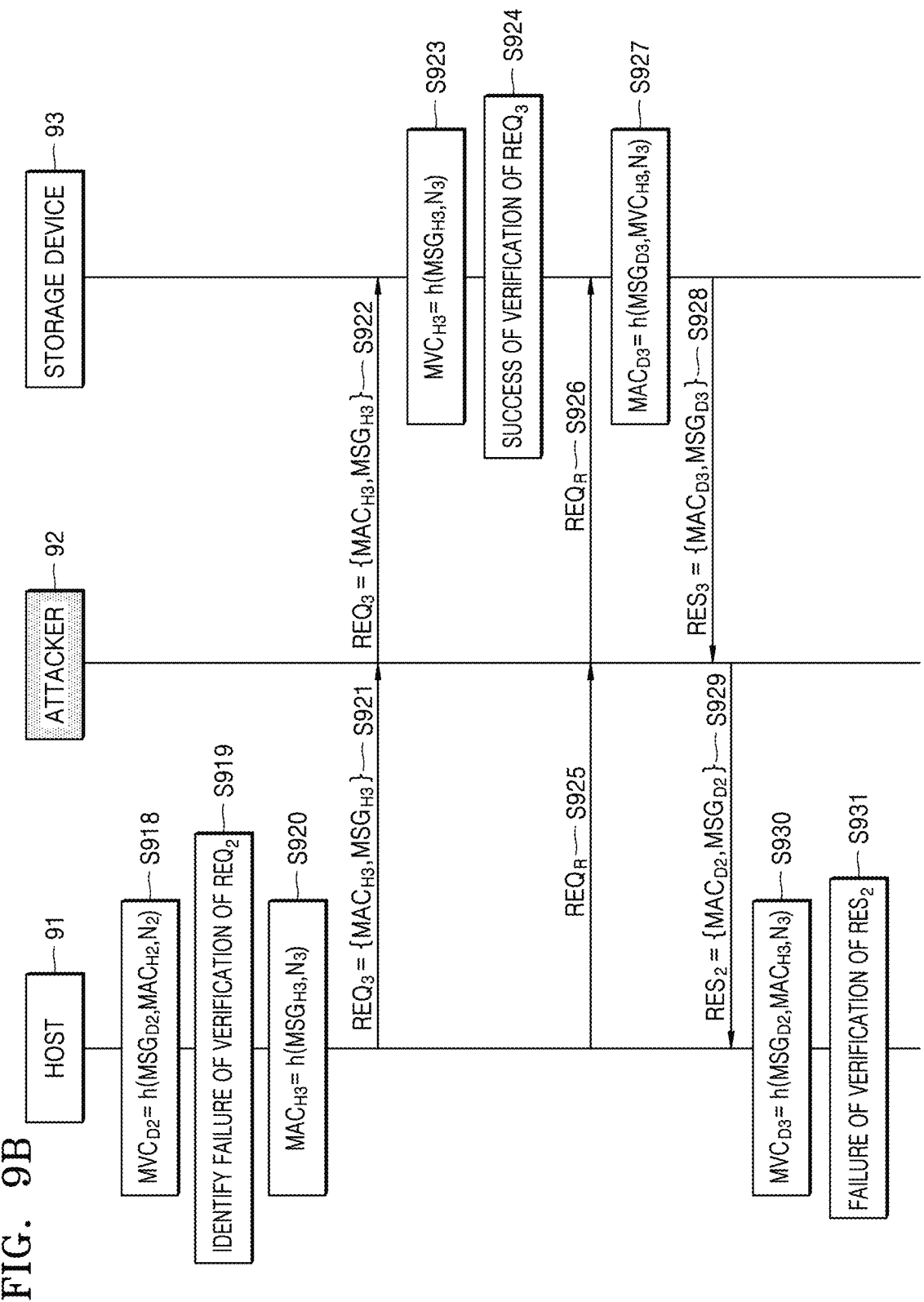

FIGS. 9A and 9B are message diagrams of a method of writing data to a protected region, according to an example embodiment. In detail, an example of an operation of detecting an MITM attack by an attacker 92 is illustrated in the message diagrams of FIGS. 9A and 9B. Redundant descriptions given above with the drawings will be omitted.

Referring to FIG. 9A, in operation S901, a host 91 may issue the first request $REQ_1$ including the first host message $MSG_{H1}$. In operation S902, the attacker 92 may transmit the first request $REQ_1$ to a storage device 93 as it is. In an example embodiment, the first host message $MSG_{H1}$ of the first request $REQ_1$ may include a message type field having a value (e.g., 0002h) corresponding to a write count read request.

In operation S903, the storage device 93 may generate the first device message authentication code $MAC_{D1}$ based on the first device message $MSG_{D1}$, an initial host message verification code $MVC_{H0}$, and the first nonce $N_1$. In operation S904, the storage device 93 may issue the first response $RES_1$, which includes the first device message authentication code $MAC_{D1}$ and the first device message $MSG_{D1}$. In operation S905, the attacker 92 may transmit the first response $RES_1$ to the host 91 as it is. At this time, the first device message $MSG_{D1}$ may include a write count and a message type field, which has a value (e.g., 0200h) corresponding to a write count read response.

In operation S906, the host 91 may generate the first device message verification code $MVC_{D1}$ based on the first device message $MSG_{D1}$, an initial message authentication code $MAC_{H0}$, and the first nonce $N_1$. As described above, because of the first request $REQ_1$ transmitted as it is to the storage device 93 and the first response $RES_1$ transmitted as it is to the host 91, the first device message verification code $MVC_{D1}$ may be identical to the first message authentication code $MAC_{D1}$, and the host 91 may identify the first response $RES_1$ as an authenticated response.

In operation S907, the host 91 may generate the second host message authentication code $MAC_{H2}$ based on the second host message $MSG_{H2}$, the first device message verification code $MVC_{D1}$, and the second nonce $N_2$. In operation S908, the host 91 may issue the second request $REQ_2$, which includes the second host message $MSG_{H2}$ and the second host message authentication code $MAC_{H2}$, and the attacker 92 may receive the second request $REQ_2$. For example, a message type field among a plurality of fields included in the second request $REQ_2$ may have a value, e.g., 0003h, which corresponds to an authenticated data write request.

In operation S909, the attacker 92 may generate a changed second request $REQ_2'$ and provide the changed second request $REQ_2'$ instead of the second request $REQ_2$ to the storage device 93. Referring to FIG. 9A, the attacker 92 may generate the changed second request $REQ_2'$, which includes the second host message $MSG_{H2}$ and a changed second host message authentication code $MAC_{H2}'$. For example, a message type field among a plurality of fields included in the changed second request $REQ_2'$ may have a value, e.g., 0003h, which corresponds to an authenticated data write request.

In operation S910, the storage device 93 may generate a second host message verification code $MVC_{H2}$ based on the second host message $MSG_{H2}$, the first device message authentication code $MAC_{D1}$, and the second nonce $N_2$. The changed second host message authentication code $MAC_{H2}'$ may be different from the second host message verification code $MVC_{H2}$. Accordingly, in operation S911, the storage device 93 may determine a failure of the verification of the changed second request $REQ_2'$.

In operation S912, the host 91 may issue a result read request $REQ_R$. In operation S913, the attacker 92 may transmit the result read request $REQ_R$ to the storage device 93 as it is. For example, a message type field among a plurality of fields included in the result read request $REQ_R$ may have a value, e.g., 0005h, which corresponds to a result read request. In operation S914, the storage device 93 may generate the second device message authentication code $MAC_{D2}$ based on the second device message $MSG_{D2}$, the second host message verification code $MVC_{H2}$, and the second nonce $N_2$. At this time, the second device message $MSG_{D2}$ may include a result field indicating the failure of the verification of the changed second request $REQ_2'$.

In operation S915, the storage device 93 may issue the second response $RES_2$, which includes the second device message authentication code $MAC_{D2}$ and the second device message $MSG_{D2}$, and the attacker 92 may receive the second response $RES_2$. For example, a message type field among a plurality of fields included in the second response $RES_2$ may have a value, e.g., 0300h, which corresponds to an authenticated data write response. The attacker 92 may store the second response $RES_2$ in operation S916 and provide the second response $RES_2$ to the host 91 in operation S917.

Referring to FIG. 9B, in operation S918, the host 91 may generate a second device message verification code $MVC_{D2}$ based on the second device message $MSG_{D2}$, the second host message authentication code $MAC_{H2}$, and the second nonce $N_2$. In operation S919, the host 91 may identify a failure of the verification of the second request $REQ_2$. The second device message verification code $MVC_{D2}$ may be identical to the second device message authentication code $MAC_{D2}$ included in the second response $RES_2$, and the host 91 may determine a success of the verification of the second response $RES_2$. Accordingly, the second device message $MSG_{D2}$ of the second response $RES_2$ is reliable, and that the second request $REQ_2$ issued in operation S908 has not normally transmitted to the storage device 93 may be identified by the result field included in the second device message $MSG_{D2}$.

In operation S920, the host 91 may generate a third host message authentication code $MAC_{H3}$ based on a third host message $MSG_{H3}$ and a third nonce $N_3$. Thus, because the failure of the verification of the second request $REQ_2$ is identified in operation S919, the host 91 may initialize the message authentication code chain. At this time, the third host message $MSG_{H3}$ may include information that indicates the initialization of the message authentication code chain.

In operation S921, the host 91 may issue a third request $REQ_3$, which includes the third host message $MSG_{H3}$ and the third host message authentication code $MAC_{H3}$. In operation S922, the attacker 92 may provide the third request $REQ_3$ to the storage device 93 as it is. For example, a message type field among a plurality of fields included in the third request $REQ_3$ may have a value, e.g., 0003h, which corresponds to an authenticated data write request.

In operation S923, the storage device 93 may generate a third host message verification code $MVC_{H3}$ based on the third host message $MSG_{H3}$ and the third nonce $N_3$. The storage device 93 may identify the initialization of the message authentication code chain by the third host message $MSG_{H3}$, and accordingly may generate the third host message verification code $MVC_{H3}$ independently of the second device message authentication code $MAC_{D2}$. Accordingly, the third host message verification code $MVC_{H3}$ may be identical to the third host message authentication code $MAC_{H3}$, and the storage device 93 may determine a success of the verification of the third request $REQ_3$ in operation S924. When the third request $REQ_3$ is a write request, the storage device 93 may write data included in the third host message $MSG_{H3}$ to the protected region.

In operation S925, the host 91 may issue the result read request $REQ_R$. In operation S926, the attacker 92 may transmit the result read request $REQ_R$ to the storage device 93 as it is. For example, a message type field among a plurality of fields included in the result read request $REQ_R$ may have a value, e.g., 0005h, which corresponds to a result read request. In operation S927, the storage device 93 may generate a third device message authentication code $MAC_{D3}$ based on a third device message $MSG_{D3}$, the third host message verification code $MVC_{H3}$, and the third nonce $N_3$. At this time, the third device message $MSG_{D3}$ may include a result field indicating a success of a write operation corresponding to the third request $REQ_3$.

In operation S928, the storage device 93 may issue a third response $RES_3$, which includes the third device message authentication code $MAC_{D3}$ and the third device message $MSG_{D3}$, and the attacker 92 may receive the third response $RES_3$. For example, a message type field among a plurality of fields included in the third response $RES_3$ may have a value, e.g., 0300h, which corresponds to an authenticated data write response. In operation S929, the attacker 92 may provide the second response $RES_2$, which is stored in operation S916, to the host 91 instead of the third response $RES_3$.

In operation S930, the host 91 may generate a third device message verification code $MVC_{D3}$ based on the second device message $MSG_{D2}$, the third host message authentication code $MAC_{H3}$, and the third nonce $N_3$. The second device message authentication code $MAC_{D2}$ included in the second response $RES_2$ may be generated based on the second nonce $N_2$ and depend on a previous message authentication code chain, i.e., a message authentication code chain before being initialized, and thus may be different from the third device message verification code $MVC_{D3}$, which is generated based on the third nonce $N_3$ and depends on the initialized message authentication code chain. Accordingly, the host 91 may determine a failure of the verification of the second response $RES_2$ in operation S931. The host 91 may not rely on the result field, which indicates the verification failure in the second device message $MSG_{D2}$, and may detect an attack of the attacker 92.

Figure 10A:
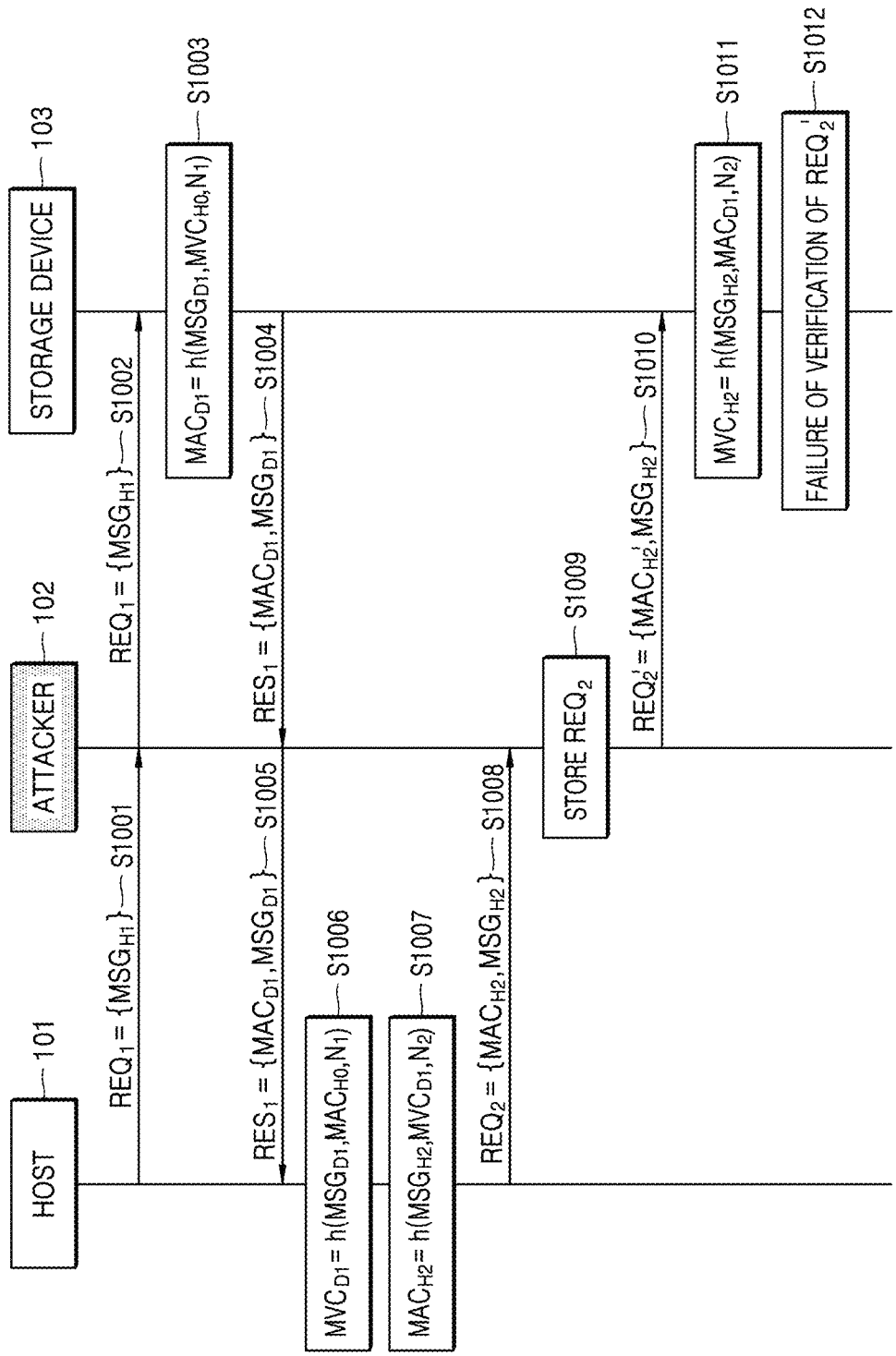
FIGS. 10A and 10B are message diagrams of a method of writing data to a protected region, according to an example embodiment.
Figure 10B:
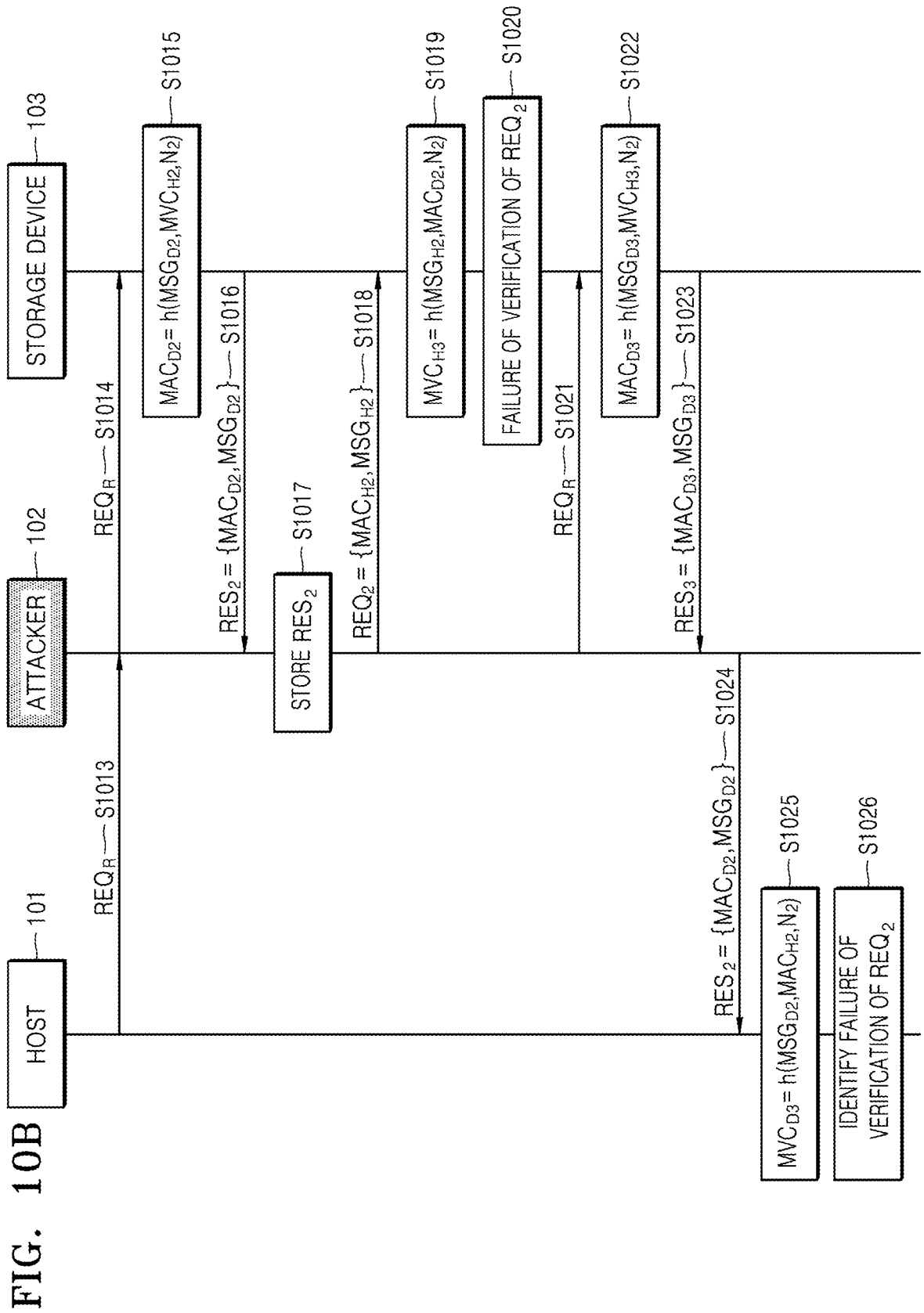

FIGS. 10A and 10B are message diagrams of a method of writing data to a protected region, according to an example embodiment. In detail, an example of an operation of detecting an MITM attack by an attacker 102 is illustrated in the message diagrams of FIGS. 10A and 10B. Redundant descriptions given above with the drawings will be omitted.

Referring to FIG. 10A, in operation S1001, a host 101 may issue the first request $REQ_1$ including the first host message $MSG_{H1}$. In operation S1002, the attacker 102 may provide the first request $REQ_1$ to a storage device 103 as it is. In an example embodiment, the first host message $MSG_{H1}$ of the first request $REQ_1$ may include a message type field having a value (e.g., 0002h) corresponding to a write count read request.

In operation S1003, the storage device 103 may generate the first device message authentication code $MAC_{D1}$ based on the first device message $MSG_{D1}$, the initial host message verification code $MVC_{H0}$, and the first nonce $N_1$. In operation S1004, the storage device 103 may issue the first response $RES_1$, which includes the first device message authentication code $MAC_{D1}$ and the first device message $MSG_{D1}$. In operation S1005, the attacker 102 may transmit the first response $RES_1$ to the host 101 as it is. At this time, the first device message $MSG_{D1}$ may include a write count and a message type field, which has a value (e.g., 0200h) corresponding to a write count read response.

In operation S1006, the host 101 may generate the first device message verification code $MVC_{D1}$ based on the first device message $MSG_{D1}$, the initial host message authentication code $MAC_{H0}$, and the first nonce $N_1$. As described above, because of the first request $REQ_1$ transmitted as it is to the storage device 103 and the first response $RES_1$ transmitted as it is to the host 101, the first device message verification code $MVC_{D1}$ may be identical to the first device message authentication code $MAC_{D1}$, and the host 101 may identify the first response $RES_1$ as an authenticated response.

In operation S1007, the host 101 may generate the second host message authentication code $MAC_{H2}$ based on the second host message $MSG_{H2}$, the first device message verification code $MVC_{D1}$, and the second nonce $N_2$. In operation S1008, the host 101 may issue the second request $REQ_2$, which includes the second host message $MSG_{H2}$ and the second host message authentication code $MAC_{H2}$, and the attacker 102 may receive the second request $REQ_2$. For example, a message type field among a plurality of fields included in the second request $REQ_2$ may have a value, e.g., 0003h, which corresponds to an authenticated data write request.

In operation S1009, the attacker 102 may store the second request $REQ_2$. In operation S1010, the attacker 102 may provide the changed second request $REQ_2'$, which includes the changed second host message authentication code $MAC_{H2}'$ and the second host message $MSG_{H2}$, to the storage device 103. For example, a message type field among a plurality of fields included in the changed second request $REQ_2'$ may have a value, e.g., 0003h, which corresponds to an authenticated data write request.

In operation S1011, the storage device 103 may generate the second host message verification code $MVC_{H2}$ based on the second host message $MSG_{H2}$, the first device message authentication code $MAC_{D1}$, and the second nonce $N_2$. The changed second host message authentication code $MAC_{H2}'$ may be different from the second host message verification code $MVC_{H2}$. Accordingly, in operation S1012, the storage device 103 may determine a failure of the verification of the changed second request $REQ_2'$.

Referring to FIG. 10B, in operation S1013, the host 101 may issue the result read request $REQ_R$. In operation S1014, the attacker 102 may transmit the result read request $REQ_R$ to the storage device 103 as it is. For example, a message type field among a plurality of fields included in the result read request $REQ_R$ may have a value, e.g., 0005h, which corresponds to a result read request. In operation S1015, the storage device 103 may generate the second device message authentication code $MAC_{D2}$ based on the second device message $MSG_{D2}$, the second host message verification code $MVC_{H2}$, and the second nonce $N_2$. At this time, the second device message $MSG_{D2}$ may include a result field indicating the failure of the verification of the changed second request $REQ_2'$.

In operation S1016, the storage device 103 may issue the second response $RES_2$, which includes the second device message authentication code $MAC_{D2}$ and the second device message $MSG_{D2}$, and the attacker 102 may receive the second response $RES_2$. For example, a message type field among a plurality of fields included in the second response $RES_2$ may have a value, e.g., 0300h, which corresponds to an authenticated data write response. In operation S1017, the attacker 102 may store the second response $RES_2$.

In operation S1018, the attacker 102 may provide the second request $REQ_2$, which includes the second host message authentication code $MAC_{H2}$ and the second host message $MSG_{H2}$, to the storage device 103. In operation S1019, the storage device 103 may generate the third host message verification code $MVC_{H3}$ based on the second host message $MSG_{H2}$, the second device message authentication code $MAC_{D2}$, and the second nonce $N_2$. The second host message authentication code $MAC_{H2}$ may be generated based on the first device message verification code $MVC_{D1}$, which is identical to the first device message authentication code $MAC_{D1}$, in operation S1007 and may thus be different from the third host message verification code $MVC_{H3}$, which is generated based on the second device message authentication code $MAC_{D2}$. Accordingly, the storage device 103 may determine a failure of the verification of the second request $REQ_2$ in operation S1020.

In operation S1021, the attacker 102 may issue the result read request $REQ_R$ to the storage device 103 as it is. In operation S1022, the storage device 103 may generate the third device message authentication code $MAC_{D3}$ based on the third device message $MSG_{D3}$, the third host message verification code $MVC_{H3}$, and the second nonce $N_2$. At this time, the third device message $MSG_{D3}$ may include a result field indicating the failure of the verification of the second request $REQ_2$.

In operation S1023, the storage device 103 may issue the third response $RES_3$, which includes the third device message authentication code $MAC_{D3}$ and the third device message $MSG_{D3}$, and the attacker 102 may receive the third response $RES_3$. For example, a message type field among a plurality of fields included in the third response $RES_3$ may have a value, e.g., 0300h, which corresponds to an authenticated data write response. In operation S1024, the attacker 102 may provide the second response $RES_2$, which includes the second device message authentication code $MAC_{D2}$ and the second device message $MSG_{D2}$, to the host 101 instead of the third response $RES_3$.

In operation S1025, the host 101 may generate the third device message verification code $MVC_{D3}$ based on the second device message $MSG_{D2}$, the second host message authentication code $MAC_{H2}$, and the second nonce $N_2$. In operation S1026, the host 101 may identify a failure of the verification of the second request $REQ_2$. The second device message authentication code $MAC_{D2}$ generated in operation S1015 may be identical to the third device message verification code $MVC_{D3}$, and the host 101 may determine a success of the verification of the second response $RES_2$. Accordingly, the host 101 may rely on the authenticated second response $RES_2$ and identify, by the result field included in the second device message $MSG_{D2}$, that the second request $REQ_2$ issued in operation S1008 has not normally transmitted to the storage device 103.

Figure 11A:
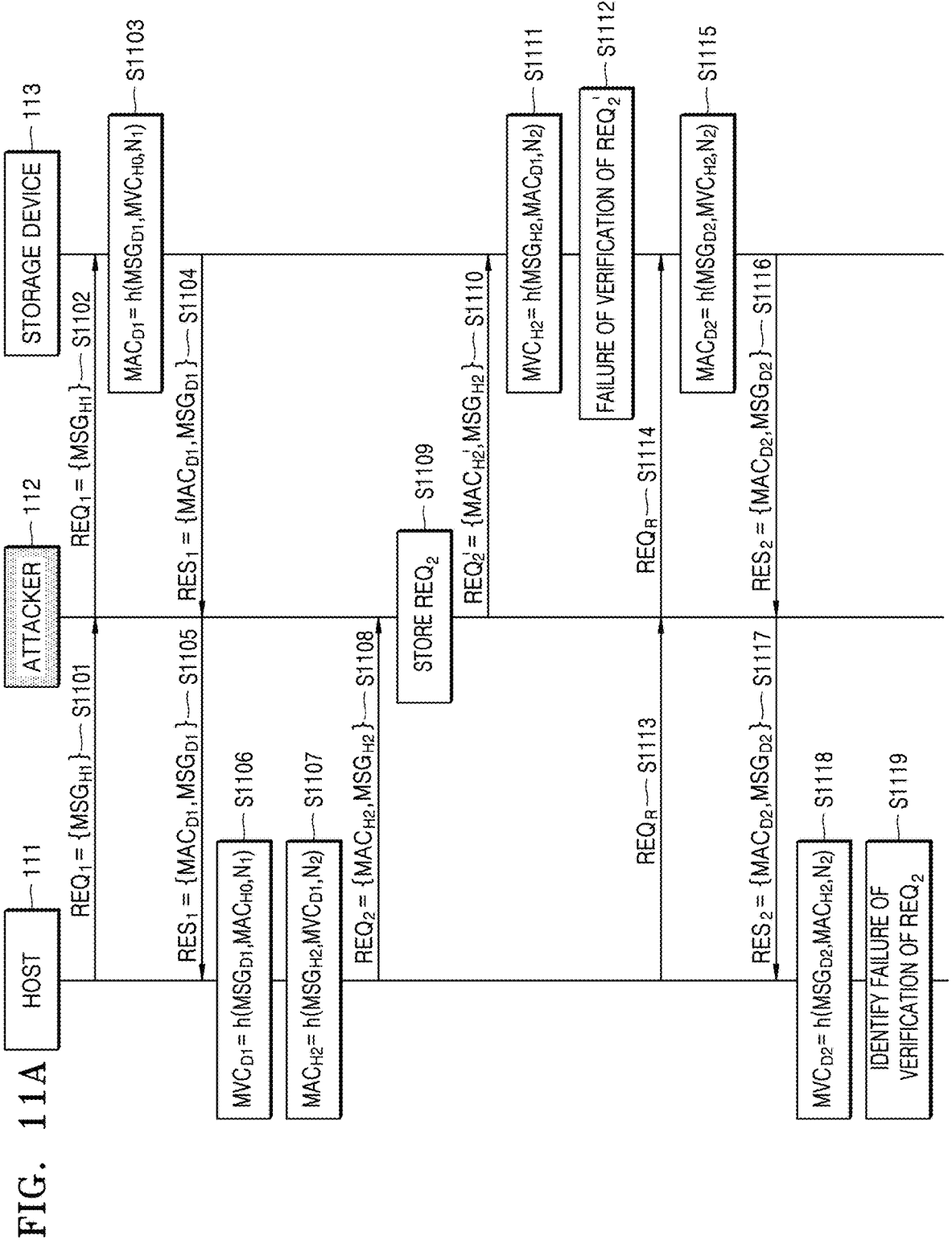
FIGS. 11A and 11B are message diagrams of a method of writing data to a protected region, according to an example embodiment.
Figure 11B:
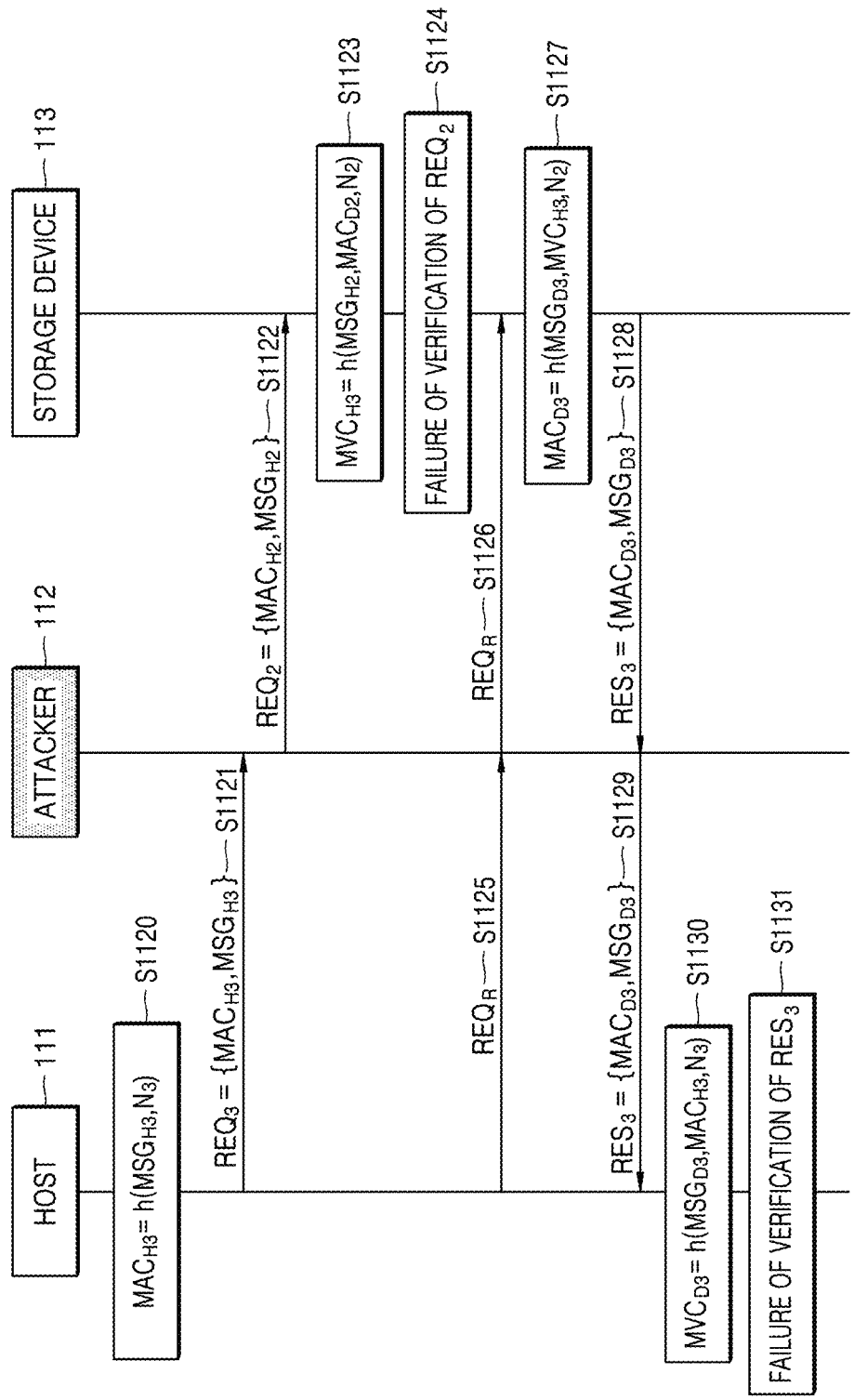

FIGS. 11A and 11B are message diagrams of a method of writing data to a protected region, according to an example embodiment. In detail, an example of an operation of detecting an MITM attack by an attacker 112 is illustrated in the message diagrams of FIGS. 11A and 11B. Redundant descriptions given above with the drawings will be omitted.

Referring to FIG. 11A, in operation S1101, a host 111 may issue the first request $REQ_1$ including the first host message $MSG_{H1}$. In operation S1102, the attacker 112 may transmit the first request $REQ_1$ to a storage device 113 as it is. In an example embodiment, the first host message $MSG_{H1}$ of the first request $REQ_1$ may include a message type field having a value (e.g., 0002h) corresponding to a write count read request.

In operation S1103, the storage device 113 may generate the first device message authentication code $MAC_{D1}$ based on the first device message $MSG_{D1}$, the initial host message verification code $MVC_{H0}$, and the first nonce $N_1$. In operation S1104, the storage device 113 may issue the first response $RES_1$, which includes the first device message authentication code $MAC_{D1}$ and the first device message $MSG_{D1}$. In operation S1105, the attacker 112 may transmit the first response $RES_1$ to the host 111 as it is. At this time, the first device message $MSG_{D1}$ may include a write count and a message type field, which has a value (e.g., 0200h) corresponding to a write count read response.

In operation S1106, the host 111 may generate the first device message verification code $MVC_{D1}$ based on the first device message $MSG_{D1}$, the initial host message authentication code $MAC_{H0}$, and the first nonce $N_1$. As described above, because of the first request $REQ_1$ transmitted as it is to the storage device 113 and the first response $RES_1$ transmitted as it is to the host 111, the first device message verification code $MVC_{D1}$ may be identical to the first device message authentication code $MAC_{D1}$, and the host 111 may identify the first response $RES_1$ as an authenticated response.

In operation S1107, the host 111 may generate the second host message authentication code $MAC_{H2}$ based on the second host message $MSG_{H2}$, the first device message verification code $MVC_{D1}$, and the second nonce $N_2$. In operation S1108, the host 111 may issue the second request $REQ_2$, which includes the second host message $MSG_{H2}$ and the second host message authentication code $MAC_{H2}$, and the attacker 112 may receive the second request $REQ_2$. For example, a message type field among a plurality of fields included in the second request $REQ_2$ may have a value, e.g., 0003h, which corresponds to an authenticated data write request.

In operation S1109, the attacker 112 may store the second request $REQ_2$. In operation S1110, the attacker 112 may provide the changed second request $REQ_2'$, which includes the changed second host message authentication code $MAC_{H2}'$ and the second host message $MSG_{H2}$, to the storage device 113. For example, a message type field among a plurality of fields included in the changed second request $REQ_2'$ may have a value, e.g., 0003h, which corresponds to an authenticated data write request.

In operation S1111, the storage device 113 may generate the second host message verification code $MVC_{H2}$ based on the second host message $MSG_{H2}$, the first device message authentication code $MAC_{D1}$, and the second nonce $N_2$. The changed second host message authentication code $MAC_{H2}'$ may be different from the second host message verification code $MVC_{H2}$. Accordingly, in operation S1112, the storage device 113 may determine a failure of the verification of the changed second request $REQ_2'$.

In operation S1113, the host 111 may issue the result read request $REQ_R$. In operation S1114, the attacker 112 may transmit the result read request $REQ_R$ to the storage device 113 as it is. For example, a message type field among a plurality of fields included in the result read request $REQ_R$ may have a value, e.g., 0005h, which corresponds to a result read request. In operation S1115, the storage device 113 may generate the second device message authentication code $MAC_{D2}$ based on the second device message $MSG_{D2}$, the second host message verification code $MVC_{H2}$, and the second nonce $N_2$. At this time, the second device message $MSG_{D2}$ may include a result field indicating the failure of the verification of the changed second request $REQ_2'$.

In operation S1116, the storage device 113 may issue the second response $RES_2$, which includes the second device message authentication code $MAC_{D2}$ and the second device message $MSG_{D2}$. In operation S1117, the attacker 112 may transmit the second response $RES_2$ to the host 111 as it is. For example, a message type field among a plurality of fields included in the second response $RES_2$ may have a value, e.g., 0300h, which corresponds to an authenticated data write response.

In operation S1118, the host 111 may generate the second device message verification code $MVC_{D2}$ based on the second device message $MSG_{D2}$, the second host message authentication code $MAC_{H2}$, and the second nonce $N_2$. In operation S1119, the host 111 may identify a failure of the verification of the second request $REQ_2$. The second device message authentication code $MAC_{D2}$ generated in operation S1115 may be identical to the second device message verification code $MVC_{D2}$, and the host 111 may determine a success of the verification of the second response $RES_2$. Accordingly, the host 111 may rely on the authenticated second response $RES_2$ and identify, by the result field included in the second device message $MSG_{D2}$, that the second request $REQ_2$ issued in operation S1108 has not normally transmitted to the storage device 113. The host 111 may initialize a message authentication code chain.

In operation S1120, the host 111 may generate the third host message authentication code $MAC_{H3}$ based on the third host message $MSG_{H3}$ and the third nonce $N_3$. In operation S1121, the host 111 may issue the third request $REQ_3$, which includes the third host message authentication code $MAC_{H3}$ and the third host message $MSG_{H3}$. For example, a message type field among a plurality of fields included in the third request $REQ_3$ may have a value, e.g., 0003h, which corresponds to an authenticated data write request. In operation S1122, the attacker 112 may provide the second request $REQ_2$, which includes the second host message authentication code $MAC_{H2}$ and the second host message $MSG_{H2}$, instead of the third request $REQ_3$ to the storage device 113.

In operation S1123, the storage device 113 may generate the third host message verification code $MVC_{H3}$ based on the second host message $MSG_{H2}$, the second device message authentication code $MAC_{D2}$, and the second nonce $N_2$. The second host message authentication code $MAC_{H2}$ may be generated based on the first device message verification code $MVC_{D1}$, which is identical to the first device message authentication code $MAC_{D1}$, in operation S1107 and may thus be different from the third host message verification code $MVC_{H3}$ generated based on the second device message authentication code $MAC_{D2}$. Accordingly, the storage device 113 may determine a failure of the verification of the second request $REQ_2$ in operation S1124.

In operation S1125, the host 111 may issue the result read request $REQ_R$. In operation S1126, the attacker 112 may transmit the result read request $REQ_R$ to the storage device 113 as it is. For example, a message type field among a plurality of fields included in the result read request $REQ_R$ may have a value, e.g., 0005h, which corresponds to a result read request. In operation S1127, the storage device 113 may generate the third device message authentication code $MAC_{D3}$ based on the third device message $MSG_{D3}$, the third host message verification code $MVC_{H3}$, and the second nonce $N_2$. At this time, the third device message $MSG_{D3}$ may include a result field indicating the failure of the verification of the second request $REQ_2$.

In operation S1128, the storage device 113 may issue the third response $RES_3$, which includes the third device message authentication code $MAC_{D3}$ and the third device message $MSG_{D3}$. In operation S1129, the attacker 112 may transmit the third response $RES_3$ to the host 111 as it is. For example, a message type field among a plurality of fields included in the third response $RES_3$ may have a value, e.g., 0300h, which corresponds to an authenticated data write response.

In operation S1130, the host 111 may generate the third device message verification code $MVC_{D3}$ based on the third device message $MSG_{D3}$, the third host message authentication code $MAC_{H3}$, and the third nonce $N_3$. The third device message authentication code $MAC_{D3}$ may be generated based on the second nonce $N_2$ in operation S1127 and may depend on a previous message authentication code chain, i.e., a message authentication code chain before being initialized, and may thus be different from the third device message verification code $MVC_{D3}$, which is generated based on the third nonce $N_3$ and depends on the initialized message authentication code chain. Accordingly, the host 111 may determine a failure of the verification of the third response $RES_3$ in operation S1131.

Figure 12:
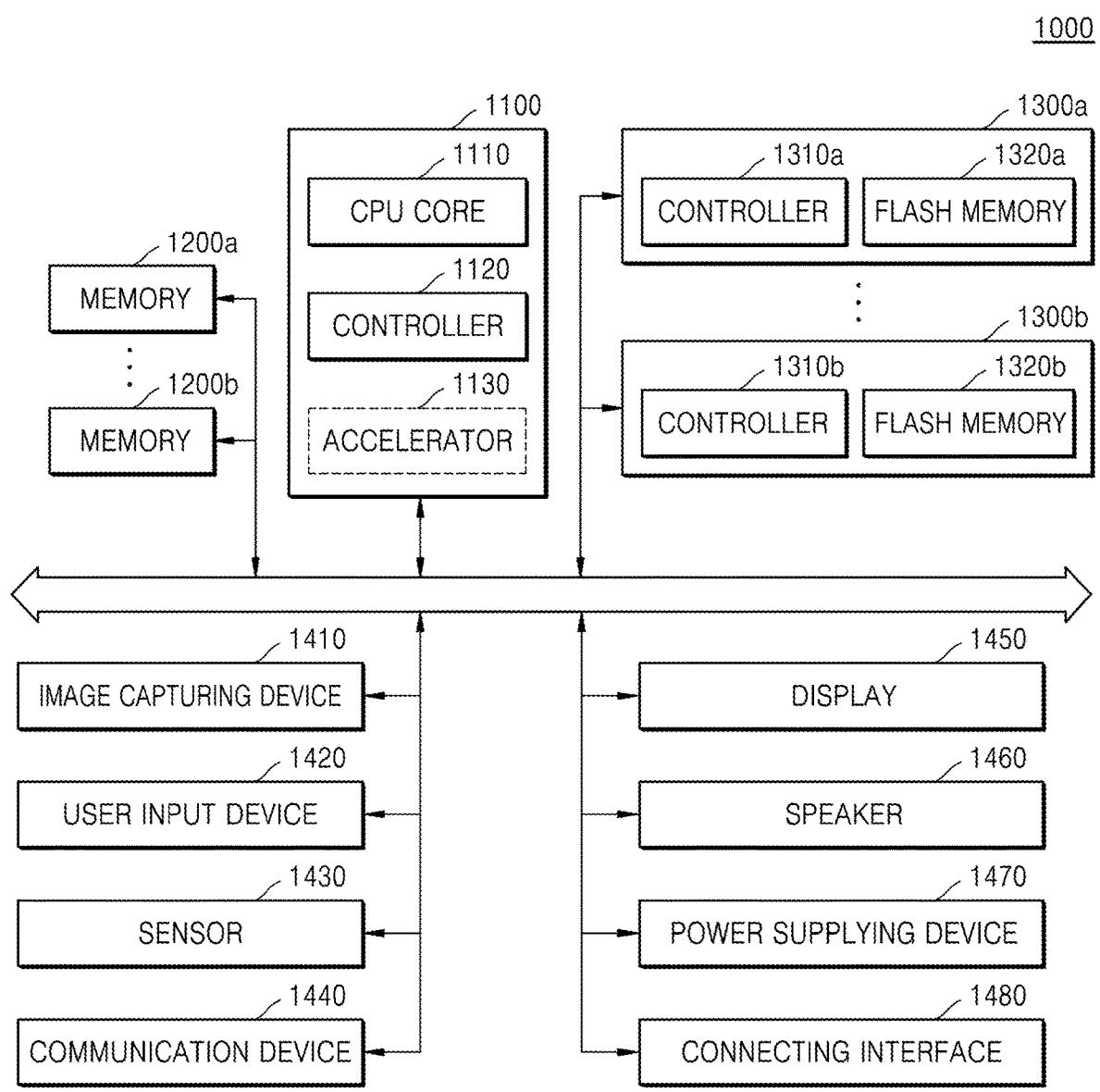
FIG. 12 is a block diagram of a system 1000 to which a storage device according to an example embodiment is applied.

FIG. 12 is a block diagram of a system 1000 to which a storage device according to an example embodiment is applied. The system 1000 of FIG. 12 may be a mobile system such as a portable communication terminal (a mobile phone), a smartphone, a tablet PC, a wearable device, a healthcare device, or an Internet of Things (IoT) device. However, the system 1000 of FIG. 12 is not limited to a mobile system and may be a PC, a laptop computer, a server, a media player, or an automotive device such as a navigation device. Hereinafter, subscripts or suffixes (e.g., a in 1200a and a in 1300a) attached to reference numerals are to discriminate a plurality of circuits configured to perform the same facility.

Referring to FIG. 12, the system 1000 may include a main processor 1100, memories 1200a and 1200b, and storage devices 1300a and 1300b. The system 1000 may include one or more of an image capturing device 1410, a user input device 1420, a sensor 1430, a communication device 1440, a display 1450, a speaker 1460, a power supplying device 1470, and a connecting interface 1480.

The main processor 1100 may control a general operation of the system 1000, e.g., may control operations of the other components included in the system 1000. The main processor 1100 may be implemented by a general-purpose processor, an exclusive processor, an AP, or the like.

The main processor 1100 may include one or more CPU cores 1110. The main processor 1100 may include a controller 1120 configured to control the memories 1200a and 1200b and/or the storage devices 1300a and 1300b. The main processor 1100 may include an accelerator block 1130, which may be an exclusive circuit configured to perform HS data calculation such as artificial intelligence (AI) data calculation. The accelerator block 1130 may include a graphics processing unit (GPU), a neural processing unit (NPU), a data processing unit (DPU), and/or the like and may be implemented by a separate chip physically independent of the other components in the main processor 1100.

The memories 1200a and 1200b may be used as a main memory device of the system 1000, and may include a volatile memory such as static random access memory (SRAM) and/or DRAM, or may include an NVM such as flash memory, PRAM, and/or RRAM. The memories 1200a and 1200b may be implemented in the same package as the main processor 1100.

The storage devices 1300a and 1300b may function as a nonvolatile storage device storing data regardless of whether power is supplied thereto, and may have a relatively larger storage capacity than the memories 1200a and 1200b. The storage devices 1300a and 1300b may include storage controllers 1310a and 1310b and NVM storages 1320a and 1320b storing data under control of the storage controllers 1310a and 1310b, respectively. The NVM storages 1320a and 1320b may include V-NAND flash memory of a two-dimensional (2D) or three-dimensional (3D) structure or another type of NVM such as PRAM and/or RRAM.

The storage devices 1300a and 1300b may be included in the system 1000 physically separated from the main processor 1100 or be implemented in the same package as the main processor 1100. The storage devices 1300a and 1300b may have a form such as a memory card form to be detachably coupled to the other components in the system 1000 through an interface such as the connecting interface 1480 to be described below. The storage devices 1300a and 1300b may be devices to which a standard protocol such as a UFS protocol is applied, but are not limited thereto.

The image capturing device 1410 may capture a still image or a moving picture, and may include a camera, a camcorder, a webcam, and/or the like.

The user input device 1420 may receive various types of data from a user of the system 1000, and may include a touch pad, a keypad, a keyboard, a mouse, a microphone, and/or the like.

The sensor 1430 may sense various types of physical quantities, which may be obtained from the outside, and convert the sensed physical quantity into an electrical signal. The sensor 1430 may include a temperature sensor, a pressure sensor, an illumination sensor, a position sensor, an acceleration sensor, a biosensor, a gyroscope, and/or the like.

The communication device 1440 may perform signal transmission and reception between the system 1000 and other devices outside the system 1000 according to various communication protocols. The communication device 1440 may be implemented using an antenna, a transceiver, a modem, and/or the like.

The display 1450 and the speaker 1460 may function as output devices configured to output visual information and auditory information to the user of the system 1000, respectively.

The power supplying device 1470 may convert power supplied from a battery (not shown) in the system 1000 and/or an external power source, and supply the converted power to each component in the system 1000.

The connecting interface 1480 may provide a connection between the system 1000 and an external device connected to the system 1000 to transmit and receive data to and from the system 1000. The connecting interface 1480 may be implemented by various interface schemes such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an NVM express (NVMe) interface, an Institute of Electrical and Electronics Engineers (IEEE) 1394 interface, a universal serial bus (USB) interface, a secure digital (SD) card interface, a multi-media card (MMC) interface, an embedded MMC (eMMC) interface, a UFS interface, an embedded UFS (eUFS) interface, and a compact flash (CF) card interface.

Figure 13:
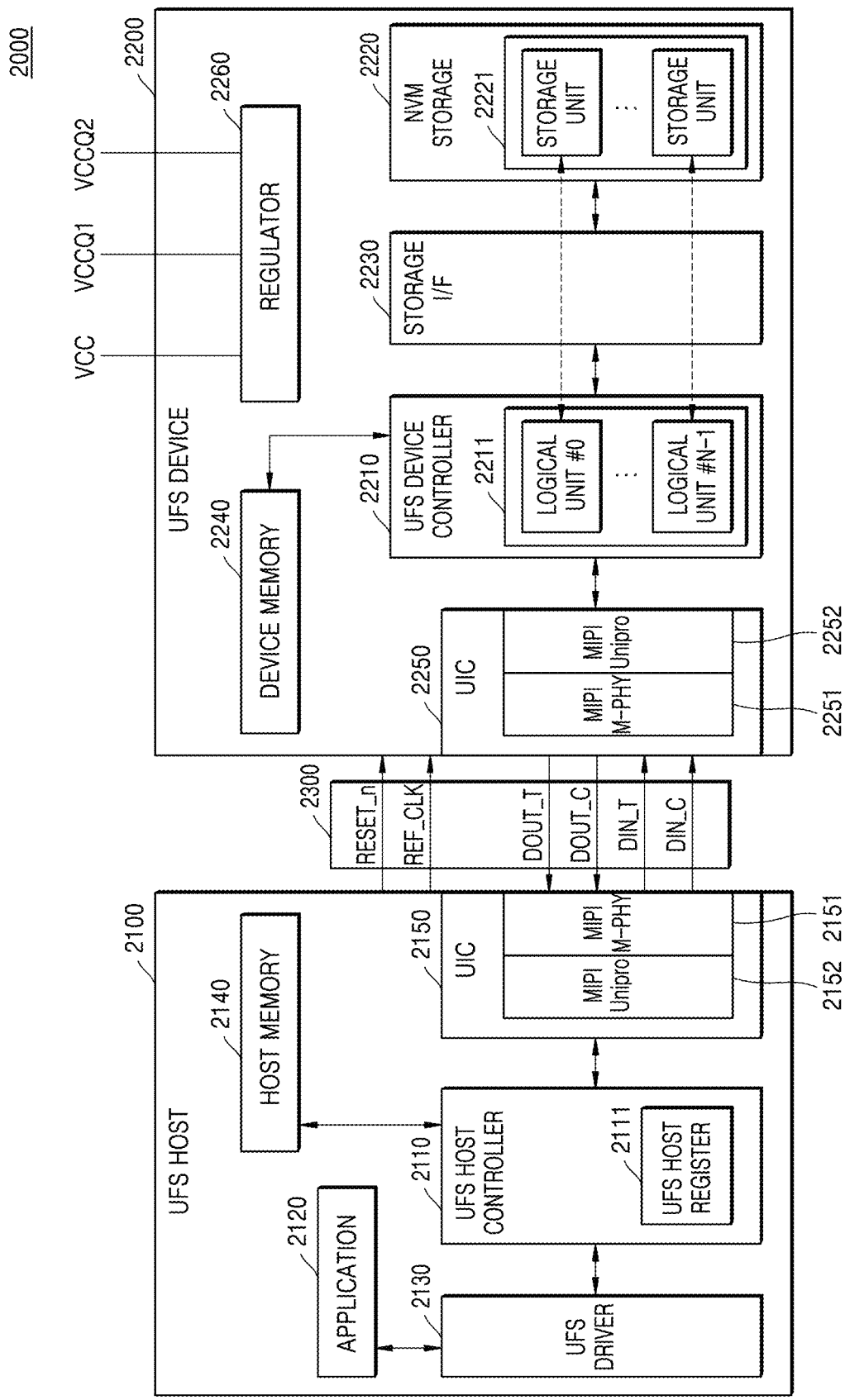
FIG. 13 is a block diagram of a UFS system 2000 according to an example embodiment.

FIG. 13 is a block diagram of a UFS system 2000 according to an example embodiment. The UFS system 2000 may be a system conforming to a UFS standard issued by the Joint Electron Device Engineering Council (JEDEC) and may include a UFS host 2100, a UFS device 2200, and a UFS interface 2300. The above description of the system 1000 of FIG. 12 may also be applied to the UFS system 2000 of FIG. 13 within a range, which does not conflict with a description made below with reference to FIG. 13.

Referring to FIG. 13, the UFS host 2100 and the UFS device 2200 may be connected to each other through the UFS interface 2300. When the main processor 1100 of FIG. 12 is an AP, the UFS host 2100 may be implemented as a part of the AP. A UFS host controller 2110 and a host memory 2140 may correspond to the controller 1120 in the main processor 1100 and the memories 1200a and 1200b of FIG. 12, respectively. The UFS device 2200 may correspond to the storage devices 1300a and 1300b of FIG. 12, and a UFS device controller 2210 and an NVM storage 2220 may correspond to the storage controllers 1310a and 1310b and the NVM storages 1320a and 1320b of FIG. 12, respectively.

The UFS host 2100 may include the UFS host controller 2110, an application 2120, a UFS driver 2130, the host memory 2140, and a UFS interconnect (UIC) layer 2150. The UFS device 2200 may include the UFS device controller 2210, the NVM storage 2220, a storage interface (I/F) 2230, a device memory 2240, a UIC layer 2250, and a regulator 2260. The NVM storage 2220 may include a plurality of storage units 2221, and the storage unit 2221 may include a V-NAND flash memory of a 2D or 3D structure or another type of NVM such as PRAM and/or RRAM. The UFS device controller 2210 and the NVM storage 2220 may be connected to each other through the storage interface 2230. The storage interface 2230 may be implemented to conform to a standard protocol such as a Toggle or Open NAND Flash Interface (ONFI) protocol.

The application 2120 may indicate a program, which desires to communicate with the UFS device 2200 to use a facility of the UFS device 2200. The application 2120 may transmit an input-output request (IOR) to the UFS driver 2130 for an input to or an output from the UFS device 2200. The IOR may indicate a data read request, a data write request, a data discard request, and/or the like but is not limited thereto.

The UFS driver 2130 may manage the UFS host controller 2110 through a UFS-host controller interface (HCI). The UFS driver 2130 may translate an IOR generated by the application 2120 into a UFS command defined by a UFS standard, and may transmit the translated UFS command to the UFS host controller 2110. One IOR may be translated into a plurality of UFS commands. A UFS command may be a command defined by a SCSI standard but may be a UFS standard exclusive command.

The UFS host controller 2110 may transmit the UFS command translated by the UFS driver 2130 to the UIC layer 2250 in the UFS device 2200 through the UIC layer 2150 and the UFS interface 2300. In this process, a UFS host register 2111 in the UFS host controller 2110 may act as a command queue (CQ).

The UIC layer 2150 in the UFS host 2100 may include a MIPI M-PHY 2151 and a MIPI UniPro 2152. The UIC layer 2250 in the UFS device 2200 may include a MIPI M-PHY 2251 and a MIPI UniPro 2252.

The UFS interface 2300 may include a line through which a reference clock signal REF_CLK is transmitted, a line through which a hardware reset signal RESET_n for the UFS device 2200 is transmitted, a pair of lines through which a differential input signal pair DIN_T and DIN_C is transmitted, and a pair of lines through which a differential output signal pair DOUT_T and DOUT_C is transmitted.

A frequency value of the reference clock signal REF_CLK provided from the UFS host 2100 to the UFS device 2200 may be, e.g., 19.2 MHZ, 26 MHZ, 38.4 MHz, or 52 MHz, but is not limited thereto. The UFS host 2100 may change the frequency value of the reference clock signal REF_CLK even during an operation, i.e., even while data is being transmitted and received between the UFS host 2100 and the UFS device 2200. The UFS device 2200 may generate clock signals of various frequencies from the reference clock signal REF_CLK received from the UFS host 2100, e.g., by using a phase-locked loop (PLL) or the like. The UFS host 2100 may set a value of a data rate between the UFS host 2100 and the UFS device 2200 based on the frequency value of the reference clock signal REF_CLK. Thus, the value of the data rate may be determined depending on the frequency value of the reference clock signal REF_CLK.

The UFS interface 2300 may support multiple lanes, and each lane may be implemented by a differential pair. In an example embodiment, the UFS interface 2300 may include one or more reception lanes and one or more transmission lanes. In FIG. 13, the pair of lines through which the differential input signal pair DIN_T and DIN_C is transmitted may form a reception lane, and the pair of lines through which the differential output signal pair DOUT_T and DOUT_C is transmitted may form a transmission lane. Although FIG. 13 shows one transmission lane and one reception lane, the number of transmission lanes and the number of reception lanes may vary.

The reception lane and the transmission lane may transmit data in a serial communication scheme, and full-duplex communication between the UFS host 2100 and the UFS device 2200 may be performed by a structure in which the reception lane is separated from the transmission lane. Thus, the UFS device 2200 may transmit data to the UFS host 2100 through the transmission lane even while receiving data from the UFS host 2100 through the reception lane. Control data such as a command from the UFS host 2100 to the UFS device 2200 and user data to be stored in or read from the NVM storage 2220 in the UFS device 2200 may be transmitted through the same lane. Accordingly, a separate lane for data transmission does not have to be provided between the UFS host 2100 and the UFS device 2200 besides the reception lane and the transmission lane.

The UFS device controller 2210 in the UFS device 2200 may generally control an operation of the UFS device 2200. The UFS device controller 2210 may manage the NVM storage 2220 through logical units (LUs) 2211, which are logical data storage units. The number of LUs 2211 may be 8 but is not limited thereto. The UFS device controller 2210 may include a flash translation layer (FTL) and may translate a logical data address, e.g., a logical block address (LBA), transmitted from the UFS host 2100 into a physical data address, e.g., a physical block address (PBA), by using address mapping information of the FTL. A logical block for storage of user data in the UFS system 2000 may have a size of a certain range. For example, a minimum size of the logical block may be set to 4 Kbytes.

When a command from the UFS host 2100 is input to the UFS device 2200 through the UIC layer 2250, the UFS device controller 2210 may perform an operation according to the input command and transmit, when the operation is completed, a completion response to the UFS host 2100.

For example, when the UFS host 2100 desires to store user data in the UFS device 2200, the UFS host 2100 may transmit a data write command to the UFS device 2200. When a ready-to-transfer response indicating ready to receive the user data is received from the UFS device 2200, the UFS host 2100 may transmit the user data to the UFS device 2200. The UFS device controller 2210 may temporarily store the received user data in the device memory 2240 and store the user data, temporarily stored in the device memory 2240, in a selected location of the NVM storage 2220 based on the address mapping information of the FTL.

As another example, when the UFS host 2100 desires to read user data stored in the UFS device 2200, the UFS host 2100 may transmit a data read command to the UFS device 2200. The UFS device controller 2210, which has received the data read command, may read the user data from the NVM storage 2220 based on the data read command and temporarily store the read user data in the device memory 2240. In this read process, the UFS device controller 2210 may detect an error of the read user data and correct the detected error, by using an embedded error correction code (ECC) circuit (not shown). Thereafter, the UFS device controller 2210 may transmit the user data, temporarily stored in the device memory 2240, to the UFS host 2100. The UFS device controller 2210 may include an advanced encryption standard (AES) circuit (not shown), and the AES circuit may encrypt or decrypt data, input to the UFS device controller 2210, by using, e.g., a symmetric-key algorithm.

The UFS host 2100 may sequentially store commands, to be transmitted to the UFS device 2200, in the UFS host register 2111, which may function as a CQ, and transmit the commands to the UFS device 2200 in the storage sequence. In this case, even when a previously transmitted command is being processed by the UFS device 2200, i.e., even when a notification indicating that the previously transmitted command is completely processed by the UFS device 2200 is not received, the UFS host 2100 may transmit a subsequent command buffered in the CQ to the UFS device 2200. Accordingly, the UFS device 2200 may also receive the subsequent command from the UFS host 2100 even while processing the previously transmitted command. A maximum number (queue depth) of commands, which may be stored in the CQ, may be, for example, 32. The CQ may be implemented in a circular queue type in which a start point and an end point of a command string stored in the CQ are respectively indicated by a head pointer and a tail pointer.

Each of the plurality of storage units 2221 may include a memory cell array and a control circuit configured to control an operation of the memory cell array. The memory cell array may include a 2D or 3D memory cell array. The memory cell array may include a plurality of memory cells, and each memory cell may be a single level cell (SLC) in which one-bit information is stored or a cell in which two-or-more-bit information is stored, such as a multi-level cell (MLC), a triple level cell (TLC), or a quadruple level cell (QLC). The 3D memory cell array may include a V-NAND string vertically oriented so that at least one memory cell is located on another memory cell.

Power source voltages such as VCC, VCCQ1, and VCCQ2 may be input to the UFS device 2200. VCC may be a main power source voltage for the UFS device 2200 and may have a value of about 2.4 V to about 3.6 V. VCCQ1 may be a power source voltage for supplying a low-level voltage, is mainly for the UFS device controller 2210, and may have a value of about 1.14 V to about 1.26 V. VCCQ2 may be a power source voltage for supplying a voltage of a level lower than VCC but higher than VCCQ1, may be mainly for an input-output interface such as the MIPI M-PHY 2251, and may have a value of about 1.7 V to about 1.95 V. The power source voltages may be supplied to each component in the UFS device 2200 through the regulator 2260. The regulator 2260 may be implemented by a set of unit regulators respectively connected to the power source voltages described above.

Figure 14A:
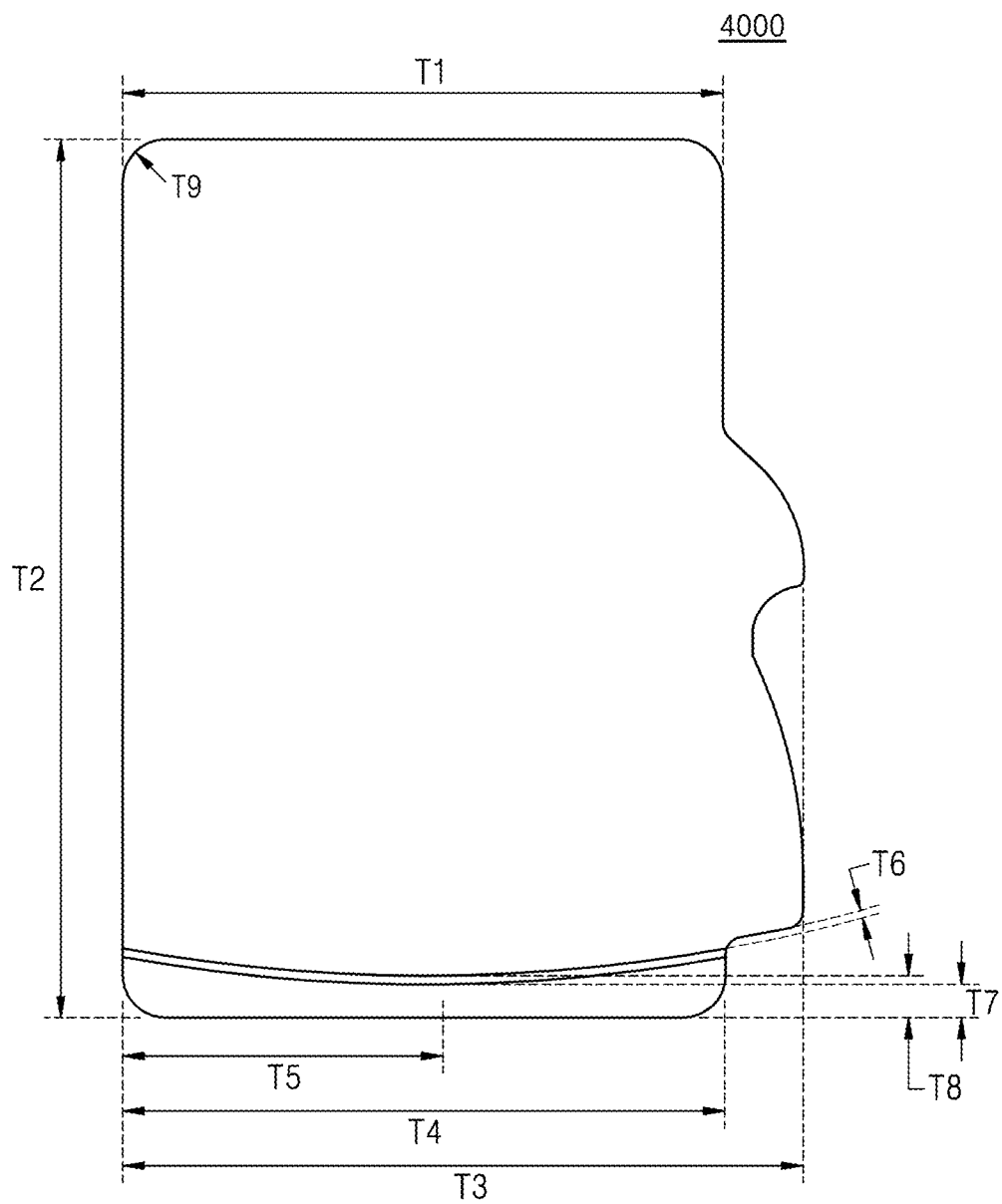
FIGS. 14A to 14C are diagrams for describing a form factor of a UFS card.
Figure 14B:
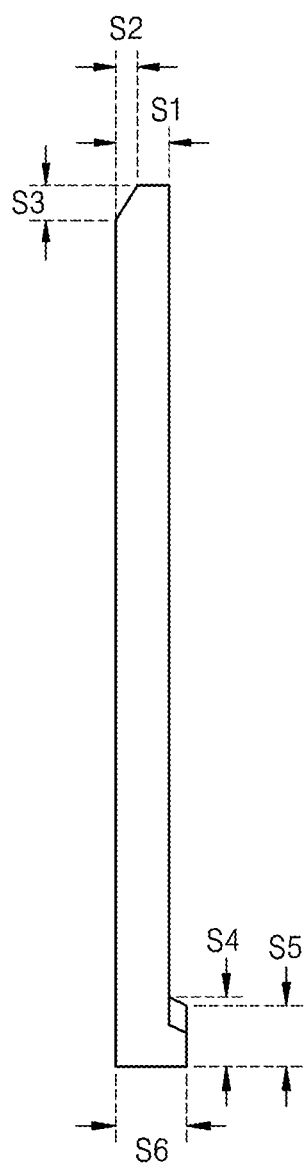
Figure 14C:
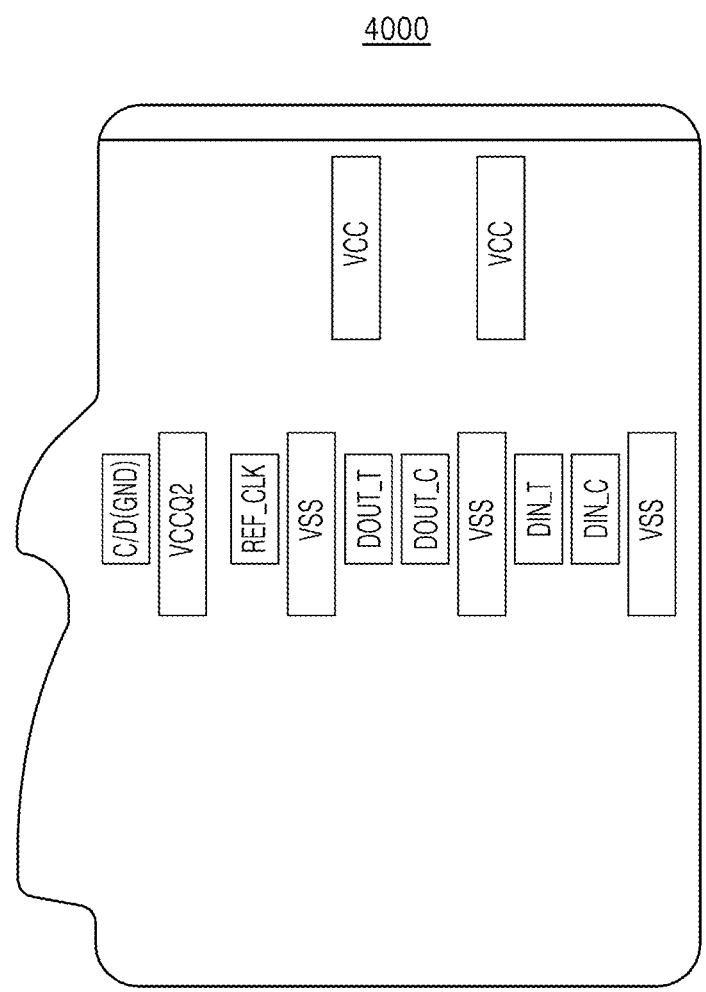

FIGS. 14A to 14C are diagrams for describing a form factor of a UFS card. When the UFS device 2200 described with reference to FIG. 13 is implemented in a form of a UFS card 4000, the exterior appearance of the UFS card 4000 may be as shown in FIGS. 14A to 14C.

FIG. 14A is a top view of the UFS card 4000. Referring to FIG. 14A, the UFS card 4000 generally has a shark-fin design. In FIG. 14A, the UFS card 4000 may have, for example, dimensions shown in Table 1 below.

TABLE 1

| Item | Dimension (mm) |
|------|----------------|
| T1   | 9.70           |
| T2   | 15.00          |
| T3   | 11.00          |
| T4   | 9.70           |
| T5   | 5.15           |
| T6   | 0.25           |
| T7   | 0.60           |
| T8   | 0.75           |
| T9   | R0.80          |

FIG. 14B is a side view of the UFS card 4000. In FIG. 14B, the UFS card 4000 may have, for example, dimensions shown in Table 2 below.

TABLE 2

| Item | Dimension (mm) |
|------|----------------|
| S1   | 0.74 ± 0.06    |
| S2   | 0.30           |
| S3   | 0.52           |
| S4   | 1.20           |
| S5   | 1.05           |
| S6   | 1.00           |

FIG. 14C is a bottom view of the UFS card 4000. Referring to FIG. 14C, a plurality of pins for an electrical contact with a UFS slot may be formed on a bottom surface of the UFS card 4000, and a function of each pin will be described below. By symmetry between a top surface and the bottom surface of the UFS card 4000, some (e.g., T1 to T5 and T9) of the information about the dimensions described with reference to FIG. 14A and Table 1 may also be applied to the bottom view of the UFS card 4000 referring to FIG. 14C.

A plurality of pins for an electrical connection with a UFS host may be formed on the bottom surface of the UFS card 4000, and according to FIG. 14C, a total number of pins may be 12. Each pin may have a rectangular shape, and a signal name corresponding to each pin is referring to FIG. 14C. Brief information of each pin may refer to Table 3 below and may also refer to the description made above with reference to FIG. 13.

TABLE 3

| Number | Signal name | Description | Dimension (mm) |
|--------|-------------|-------------|----------------|
| 1 | VSS | Ground (GND) | 3.00 × 0.72 ± 0.05 |
| 2 | DIN_C | Differential input signal input from a host | 1.50 × 0.72 ± 0.05 |
| 3 | DIN_T | to the UFS card 4000 (DIN _C denotes a negative node, and DINT denotes a positive node) | |
| 4 | VSS | Same as number 1 | 3.00 × 0.72 ± 0.05 |
| 5 | DOUT_C | Differential output signal output from the UFS | 1.50 × 0.72 ± 0.05 |
| 6 | DOUT_T | card 4000 to a host (DOUT_C denotes a negative node, and DOUT_T denotes a positive node) | |
| 7 | VSS | Same as number 1 | 3.00 × 0.72 ± 0.05 |
| 8 | REF_CLK | Reference clock provided from a host to the UFS card 4000 | 1.50 × 0.72 ± 0.05 |

TABLE 3-continued

| Signal Number | Signal name | Description | Dimension (mm) |
|---|---|---|---|
| 9 | VCCQ2 | Power source voltage having a relatively lower value than VCC, which is = mainly provided for a PHY interface or a controller | 3.00 × 0.72 ± 0.05 |
| 10 | C/D(GND) | Signal for card detection | 1.50 × 0.72 ± 0.05 |
| 11 | VSS | Same as number 1 | 3.00 × 0.80 ± 0.05 |
| 12 | Vcc | Main power source voltage | |

Figure 15:
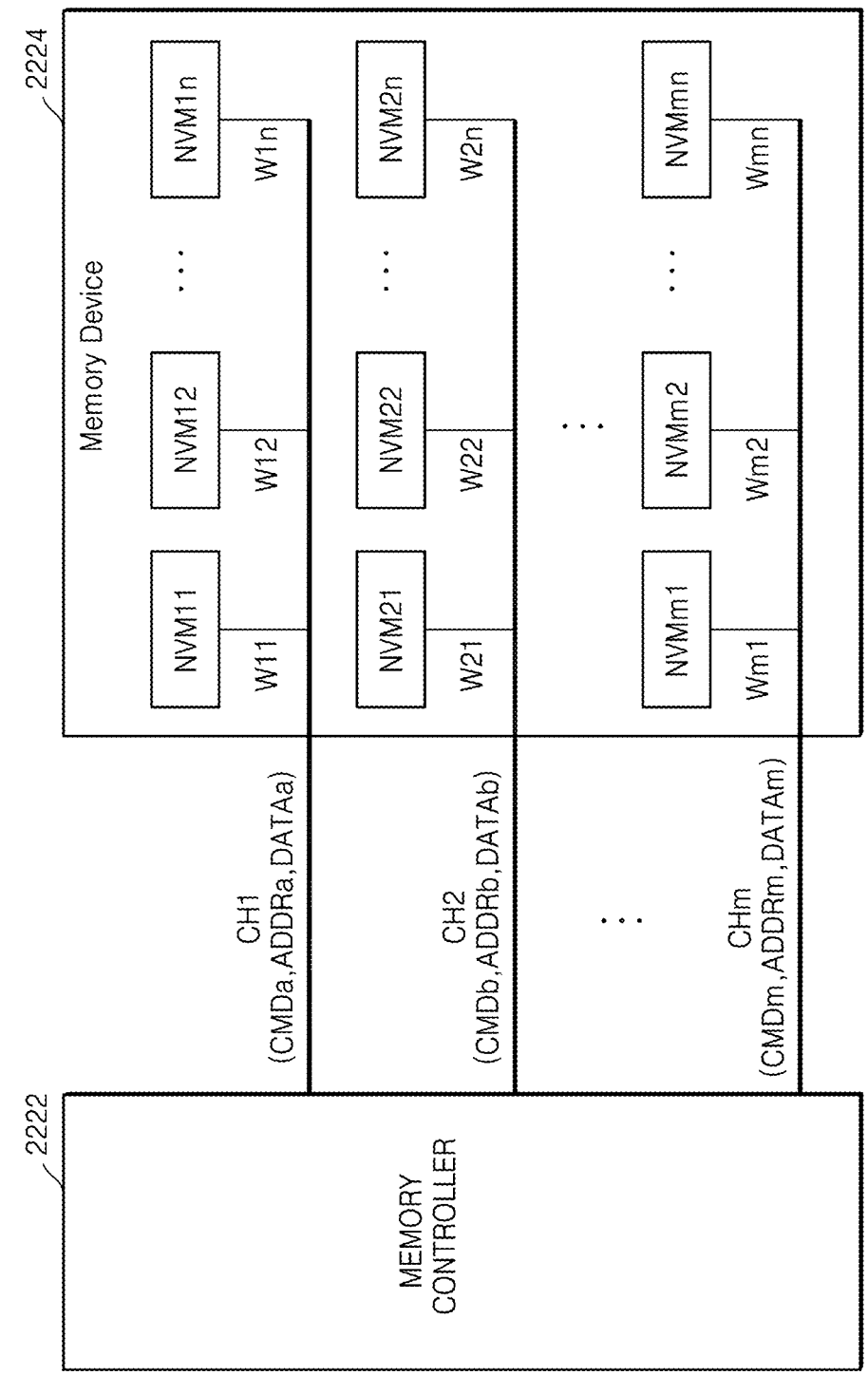
FIG. 15 is a block diagram of a NVM storage 2220*a* according to an example embodiment.

FIG. 15 is a block diagram of a NVM storage 2220a according to an example embodiment.

Referring to FIG. 15, the NVM storage 2220a may include a memory device 2224 and a memory controller 2222. The NVM storage 2220a may support a plurality of channels, e.g., first to mth channels CH1 to CHm, and the memory device 2224 and the memory controller 2222 may be connected to each other through the first to mth channels CH1 to CHm. In an example embodiment, the NVM storage 2220a may be implemented by a storage device such as an SSD.

The memory device 2224 may include a plurality of NVM devices NVM11 to NVMmn. Each of the plurality of NVM devices NVM11 to NVMmn may be connected to one of the first to mth channels CH1 to CHm through a corresponding way. In an example embodiment, the NVM devices NVM11 to NVM1n may be connected to the first channel CH1 through ways W11 to W1n, respectively, and the NVM devices NVM21 to NVM2n may be connected to the second channel CH2 through ways W21 to W2n, respectively. In an example embodiment, each of the plurality of NVM devices NVM11 to NVMmn may be implemented in random memory units operable according to an individual command from the memory controller 2222. For example, each of the plurality of NVM devices NVM11 to NVMmn may be implemented by a chip or a die, but embodiments are not limited thereto.

The memory controller 2222 may transmit and receive signals to and from the memory device 2224 through the first to mth channels CH1 to CHm. In an example embodiment, the memory controller 2222 may transmit commands CMDa~CMDm, addresses ADDRa~ADDRm, and data DATAa~DATAm to the memory device 2224 or receive the data DATAa~DATAm from the memory device 2224, through the first to mth channels CH1 to CHm.

The memory controller 2222 may select, through a corresponding channel, one of NVM devices connected to the corresponding channel and transmit and receive signals to and from the selected NVM device. In an example embodiment, the memory controller 2222 may select the NVM device NVM11 from among the NVM devices NVM11 to NVM1n connected to the first channel CH1. The memory controller 2222 may transmit the command CMDa, the address ADDRa, and the data DATAa to the selected NVM device NVM11 or receive the data DATAa from the selected NVM device NVM11, through the first channel CH1.

The memory controller 2222 may transmit and receive signals to and from the memory device 2224 in parallel through different channels. In an example embodiment, the memory controller 2222 may transmit the command CMDb to the memory device 2224 through the second channel CH2 while transmitting the command CMDa to the memory device 2224 through the first channel CH1. In an example embodiment, the memory controller 2222 may receive the data DATAb from the memory device 2224 through the second channel CH2 while receiving the data DATAa from the memory device 2224 through the first channel CH1.

The memory controller 2222 may control a general operation of the memory device 2224. The memory controller 2222 may control each of the plurality of NVM devices NVM11 to NVMmn connected to the first to mth channels CH1 to CHm by transmitting a signal through the first to mth channels CH1 to CHm. In an example embodiment, the memory controller 2222 may control one selected from among the NVM devices NVM11 to NVM1n, by transmitting the command CMDa and the address ADDRa through the first channel CH1.

Each of the plurality of NVM devices NVM11 to NVMmn may be operated under control of the memory controller 2222. In an example embodiment, the NVM device NVM11 may program the data DATAa according to the command CMDa, the address ADDRa, and the data DATAa provided through the first channel CH1. In an example embodiment, the nonvolatile memory device NVM21 may read the data DATAb according to the command CMDb and the address ADDRb provided through the second channel CH2 and transmit the read data DATAb to the memory controller 2222.

Although FIG. 15 shows that the memory device 2224 communicates with the memory controller 2222 through m channels and includes n NVM devices in correspondence to each channel, the number of channels and the number of NVM devices connected to one channel may be variously changed.

Figure 16:
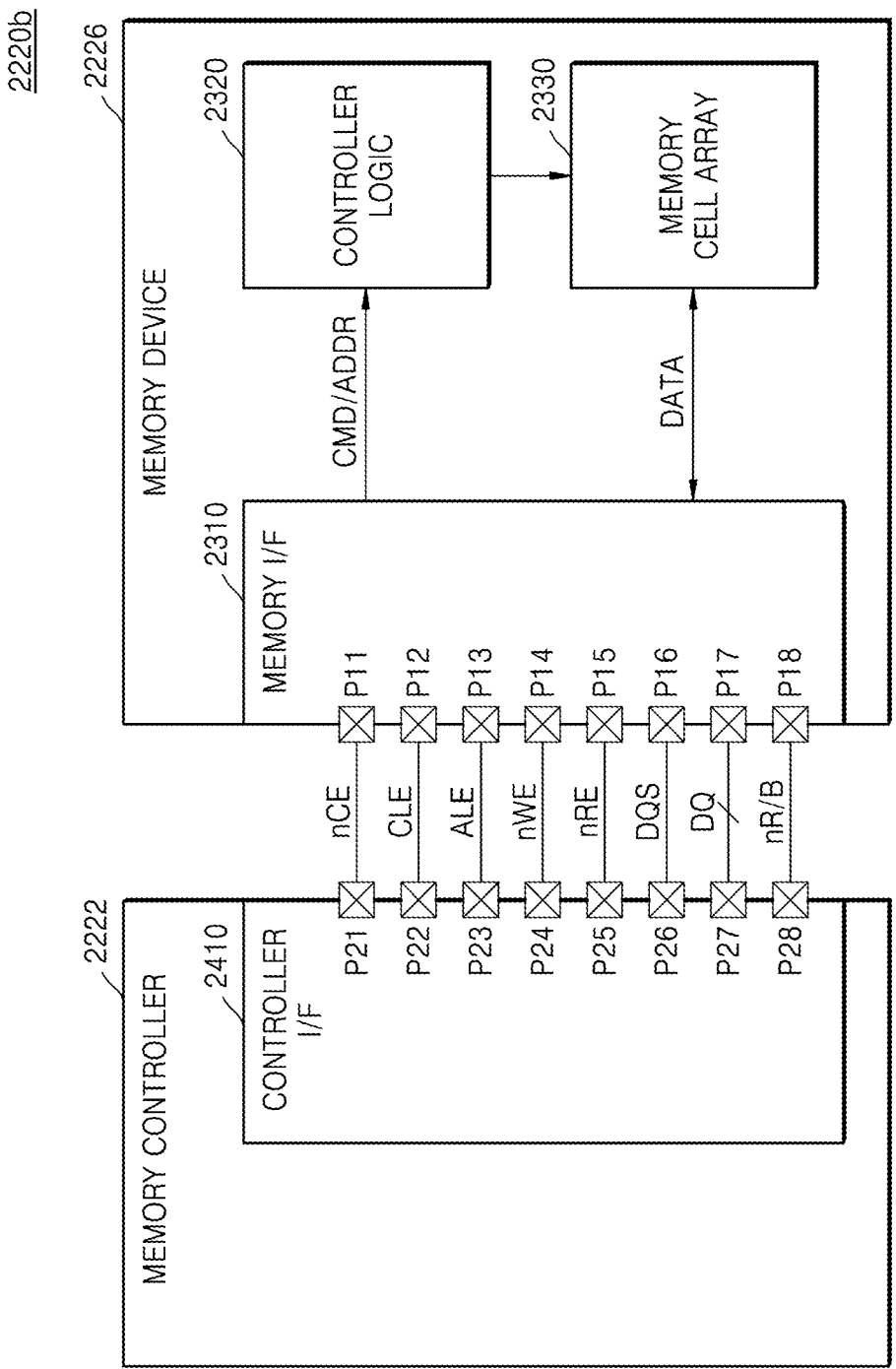
FIG. 16 is a block diagram of an NVM storage 2220*b* according to an example embodiment.

FIG. 16 is a block diagram of an NVM storage 2220b according to an example embodiment. Referring to FIG. 16, the NVM storage 2220b may include a memory device 2226 and the memory controller 2222. The memory device 2226 may correspond to one of the plurality of NVM devices NVM11 to NVMmn, which communicates with the memory controller 2222 based on one of the first to mth channels CH1 to CHm of FIG. 15. The memory controller 2222 may correspond to the memory controller 2222 of FIG. 15.

The memory device 2226 may include first to eighth pins P11 to P18, a memory interface circuit 2310, a control logic circuit 2320, and a memory cell array 2330.

The memory interface circuit 2310 may receive a chip enable signal nCE from the memory controller 2222 through the first pin P11. The memory interface circuit 2310 may transmit and receive signals to and from the memory controller 2222 through the second to eighth pins P12 to P18 in response to the chip enable signal nCE. For example, when the chip enable signal nCE is in an enable state (e.g., a low level), the memory interface circuit 2310 may transmit and receive signals to and from the memory controller 2222 through the second to eighth pins P12 to P18.

The memory interface circuit 2310 may receive a command latch enable signal CLE, an address latch enable signal ALE, and a write enable signal nWE from the memory controller 2222 through the second to fourth pins P12 to P14, respectively. The memory interface circuit 2310 may receive or transmit a data signal DQ from or to the memory controller 2222 through the seventh pin P17. A command CMD, an address ADDR, and data DATA may be delivered through the data signal DQ. In an example embodiment, the data signal DQ may be delivered through a plurality of data signal lines. In this case, the seventh pin P17 may include a plurality of pins corresponding to the plurality of data signal lines.

The memory interface circuit 2310 may obtain the command CMD from the data signal DQ received in an enable period (e.g., a high-level state) of the command latch enable signal CLE, based on toggle timings of the write enable signal nWE. The memory interface circuit 2310 may obtain the address ADDR from the data signal DQ received in an enable period (e.g., a high-level state) of the address latch enable signal ALE, based on toggle timings of the write enable signal nWE.

In an example embodiment, the write enable signal nWE may maintain a static state (e.g., a high level or a low level) and then toggle between the high level and the low level. In an example embodiment, the write enable signal nWE may toggle in a period in which the command CMD or the address ADDR is transmitted. Accordingly, the memory interface circuit 2310 may obtain the command CMD or the address ADDR based on toggle timings of the write enable signal nWE.

The memory interface circuit 2310 may receive a read enable signal nRE from the memory controller 2222 through the fifth pin P15. The memory interface circuit 2310 may receive or transmit a data strobe signal DQS from or to the memory controller 2222 through the sixth pin P16.

In a data output operation of the memory device 2226, the memory interface circuit 2310 may receive the read enable signal nRE, which toggles, through the fifth pin P15 before outputting the data DATA. The memory interface circuit 2310 may generate the data strobe signal DQS, which toggles, based on the toggling of the read enable signal nRE. In an example embodiment, the memory interface circuit 2310 may generate the data strobe signal DQS, which starts to toggle after a pre-defined delay (e.g., tDQSRE) from a toggling start time of the read enable signal nRE. The memory interface circuit 2310 may transmit the data signal DQ including the data DATA based on toggle timing of the data strobe signal DQS. Accordingly, the data DATA may be aligned with the toggle timing of the data strobe signal DQS and transmitted to the memory controller 2222.

In a data input operation of the memory device 2226, when the data signal DQ including the data DATA is received from the memory controller 2222, the memory interface circuit 2310 may receive the data strobe signal DQS, which toggles, together with the data DATA from the memory controller 2222. The memory interface circuit 2310 may obtain the data DATA from the data signal DQ based on toggle timing of the data strobe signal DQS. In an example embodiment, the memory interface circuit 2310 may obtain the data DATA by sampling the data signal DQ at a leading edge and a trailing edge of the data strobe signal DQS.

The memory interface circuit 2310 may transmit a ready/busy output signal nR/B to the memory controller 2222 through the eighth pin P18. The memory interface circuit 2310 may transmit state information of the memory device 2226 to the memory controller 2222 through the ready/busy output signal nR/B. When the memory device 2226 is in a busy state (i.e., while performing internal operations of the memory device 2226), the memory interface circuit 2310 may transmit the ready/busy output signal nR/B indicating the busy state to the memory controller 2222. When the memory device 2226 is in a ready state (i.e., when internal operations of the memory device 2226 are not performed or are completed), the memory interface circuit 2310 may transmit the ready/busy output signal nR/B indicating the ready state to the memory controller 2222. For example, while the memory device 2226 is reading the data DATA from the memory cell array 2330 in response to a page read command, the memory interface circuit 2310 may transmit the ready/busy output signal nR/B indicating the busy state (e.g., the low level) to the memory controller 2222. For example, while the memory device 2226 is programming the data DATA to the memory cell array 2330 in response to a program command, the memory interface circuit 2310 may transmit the ready/busy output signal nR/B indicating the busy state to the memory controller 2222.

The control logic circuit 2320 may generally control various kinds of operations of the memory device 2226. The control logic circuit 2320 may receive the command/address CMD/ADDR from the memory interface circuit 2310. The control logic circuit 2320 may generate control signals for controlling the other components in the memory device 2226, in response to the received command/address CMD/ADDR. In an example embodiment, the control logic circuit 2320 may generate various kinds of control signals for programming or reading the data DATA to or from the memory cell array 2330.

The memory cell array 2330 may store the data DATA obtained from the memory interface circuit 2310, under control of the control logic circuit 2320. The memory cell array 2330 may output the stored data DATA to the memory interface circuit 2310 under control of the control logic circuit 2320.

The memory cell array 2330 may include a plurality of memory cells. In an example embodiment, the plurality of memory cells may be flash memory cells. However, embodiments are not limited thereto, and the plurality of memory cells may be RRAM cells, ferroelectric random access memory (FRAM) cells, PRAM cells, thyristor random access memory (TRAM) cells, or MRAM cells. Hereinafter, embodiments will be described based on an example embodiment in which the plurality of memory cells are NAND flash memory cells.

The memory controller 2222 may include first to eighth pins P21 to P28 and a controller interface circuit 2410. The first to eighth pins P21 to P28 may correspond to the first to eighth pins P11 to P18 in the memory device 2226.

The controller interface circuit 2410 may transmit the chip enable signal nCE to the memory device 2226 through the first pin P21. The controller interface circuit 2410 may transmit and receive, through the second to eighth pins P22 to P28, signals to and from the memory device 2226 selected based on the chip enable signal nCE.

The controller interface circuit 2410 may transmit the command latch enable signal CLE, the address latch enable signal ALE, and the write enable signal nWE to the memory device 2226 through the second to fourth pins P22 to P24, respectively. The controller interface circuit 2410 may transmit or receive the data signal DQ to or from the memory device 2226 through the seventh pin P27.

The controller interface circuit 2410 may transmit, to the memory device 2226, the data signal DQ including the command CMD or the address ADDR together with the write enable signal nWE, which toggles. The controller interface circuit 2410 may transmit the data signal DQ including the command CMD to the memory device 2226 according to transmission of the command latch enable signal CLE having an enable state, and transmit the data signal DQ including the address ADDR to the memory device 2226 according to transmission of the address latch enable signal ALE having an enable state.

The controller interface circuit 2410 may transmit the read enable signal nRE to the memory device 2226 through the fifth pin P25. The controller interface circuit 2410 may receive or transmit the data strobe signal DQS from or to the memory device 2226 through the sixth pin P26.

In a data output operation of the memory device 2226, the controller interface circuit 2410 may generate the read enable signal nRE, which toggles, and transmit the read enable signal nRE to the memory device 2226. In an example embodiment, the controller interface circuit 2410 may generate the read enable signal nRE, which changes from the static state (e.g., the high level or the low level) to a toggle state, before the data DATA is output. Accordingly, the memory device 2226 may generate the data strobe signal DQS, which toggles, based on the read enable signal nRE. The controller interface circuit 2410 may receive, from the memory device 2226, the data signal DQ including the data DATA together with the data strobe signal DQS, which toggles. The controller interface circuit 2410 may obtain the data DATA from the data signal DQ based on toggle timing of the data strobe signal DQS.

In a data input operation of the memory device 2226, the controller interface circuit 2410 may generate the data strobe signal DQS, which toggles. In an example embodiment, the controller interface circuit 2410 may generate the data strobe signal DQS, which changes from the static state (e.g., the high level or the low level) to the toggle state, before the data DATA is transmitted. The controller interface circuit 2410 may transmit the data signal DQ including the data DATA to the memory device 2226, based on toggle timings of the data strobe signal DQS.

The controller interface circuit 2410 may receive the ready/busy output signal nR/B from the memory device 2226 through the eighth pin P28, and may determine state information of the memory device 2226 based on the ready/busy output signal nR/B.

Figure 17:
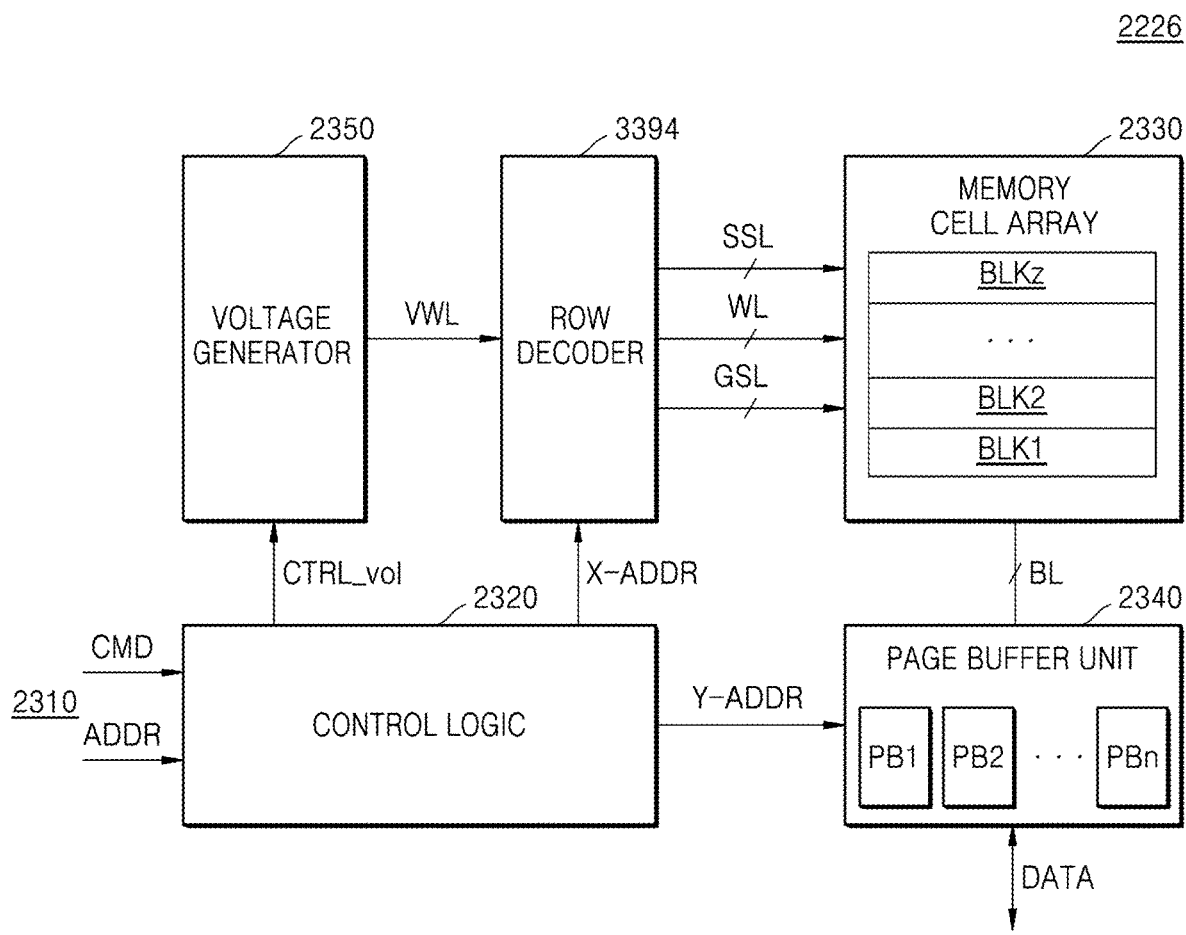
FIG. 17 is a block diagram of the memory device 2226 of FIG. 16.

FIG. 17 is a block diagram of the memory device 2226 of FIG. 16. Referring to FIG. 17, the memory device 2226 may include the control logic circuit 2320, the memory cell array 2330, a page buffer unit 2340, a voltage generator 2350, and a row decoder 3394. Although not shown in FIG. 17, the memory device 2226 may include the memory interface circuit 2310 shown in FIG. 16. The memory device 2226 may include a column logic, a pre-decoder, a temperature sensor, a command decoder, an address decoder, and the like.

The control logic circuit 2320 may generally control various kinds of operations of the memory device 2226. The control logic circuit 2320 may output various kinds of control signals in response to the command CMD and/or the address ADDR from the memory interface circuit 2310. In an example embodiment, the control logic circuit 2320 may output a voltage control signal CTRL_vol, a row address X-ADDR, and a column address Y-ADDR.

The memory cell array 2330 may include a plurality of memory blocks BLK1 to BLKz (z is a positive integer), and each of the plurality of memory blocks BLK1 to BLKz may include a plurality of memory cells. The memory cell array 2330 may be connected to the page buffer unit 2340 through bit lines BL and connected to the row decoder 3394 through word lines WL, string select lines SSL, and ground select lines GSL.

In an example embodiment, the memory cell array 2330 may include a 3D memory cell array, and the 3D memory cell array may include a plurality of NAND strings. Each NAND string may include memory cells respectively connected to word lines vertically stacked on a substrate. U.S. Pat. Nos. 7,679,133, 8,553,466, 8,654,587, and 8,559,235 and U.S. Patent Publication No. 2011/0233648 A1 are herein incorporated in their entirety by reference. In an example embodiment, the memory cell array 2330 may include a 2D memory cell array, and the 2D memory cell array may include a plurality of NAND strings arranged in row and column directions.

The page buffer unit 2340 may include a plurality of page buffers PB1 to PBn (n is an integer greater than or equal to 3), and the plurality of page buffers PB1 to PBn may be connected to memory cells through a plurality of bit lines BL, respectively. The page buffer unit 2340 may select at least one bit line BL from among the plurality of bit lines BL in response to the column address Y-ADDR. The page buffer unit 2340 may operate as a write driver or a sense amplifier according to an operation mode. For example, in a program operation, the page buffer unit 2340 may apply, to a selected bit line BL, a bit line voltage corresponding to data to be programmed. In a read operation, the page buffer unit 2340 may sense data stored in a memory cell by sensing a current or a voltage of a selected bit line BL.

The voltage generator 2350 may generate various types of voltages for performing program, read, and discard operations, based on the voltage control signal CTRL_vol. In an example embodiment, the voltage generator 2350 may generate a program voltage, a read voltage, a program verify voltage, a discard voltage, or the like as a word line voltage VWL.

The row decoder 3394 may select one of a plurality of word lines WL in response to the row address X-ADDR and select one of a plurality of string select lines SSL. For example, in a program operation, the row decoder 3394 may apply the program voltage and the program verify voltage to a selected word line WL, and in a read operation, the row decoder 3394 may apply the read voltage to a selected word line WL.

Figure 18:
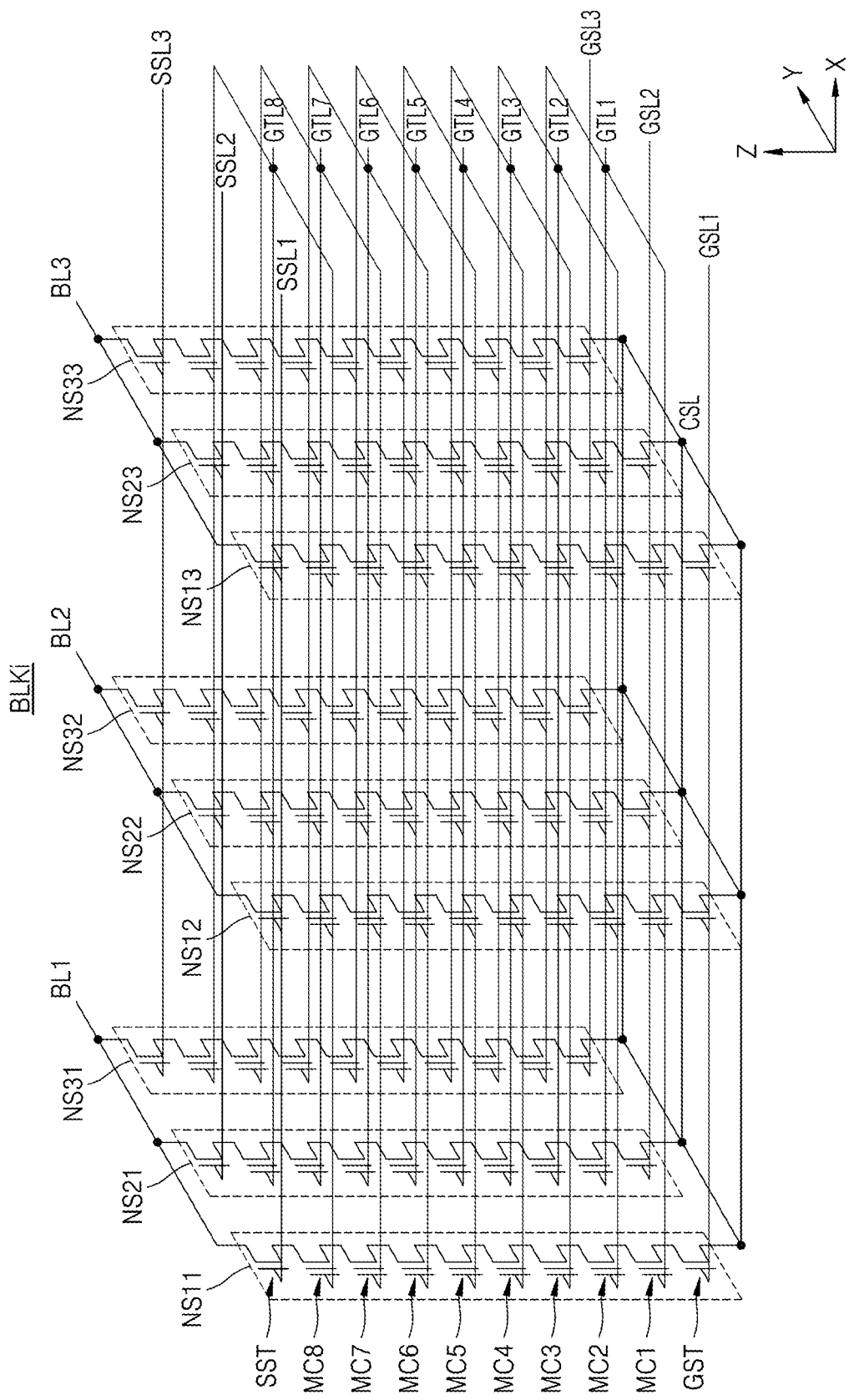
FIG. 18 is a diagram for describing a 3D V-NAND structure applicable to a UFS device, according to an example embodiment.

FIG. 18 is a diagram for describing a 3D V-NAND structure applicable to a UFS device, according to an example embodiment. When a storage module in the UFS device is implemented by 3D V-NAND-type flash memory, each of a plurality of memory blocks included in the storage module may be represented by an equivalent circuit referring to FIG. 18.

A memory block BLKi shown in FIG. 18 indicates a 3D memory block formed in a 3D structure on a substrate. For example, a plurality of memory NAND strings included in the memory block BLKi may be formed in a direction vertical to the substrate.

Referring to FIG. 18, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, ..., MC8, and a ground select transistor GST. Although FIG. 18 shows that each of the plurality of memory NAND strings NS11 to NS33 includes eight memory cells MC1, MC2, ..., MC8, embodiments are not limited thereto.

The string select transistor SST may be connected to a corresponding string select line SSL1, SSL2, or SSL3. The plurality of memory cells MC1, MC2, ..., MC8 may be connected to corresponding gate lines GTL1, GTL2, ..., GTL8, respectively. The gate lines GTL1, GTL2, ..., GTL8 may correspond to word lines, and some of the gate lines GTL1, GTL2, ..., GTL8 may correspond to dummy word lines. The ground select transistor GST may be connected to a corresponding ground select line GSL1, GSL2, or GSL3. The string select transistor SST may be connected to a corresponding bit line BL1, BL2, or BL3, and the ground select transistor GST may be connected to the common source line CSL.

A word line (e.g., WL1) of the same height may be commonly connected, and the ground select lines GSL1, GSL2, and GSL3 and the string select lines SSL1, SSL2, and SSL3 may be individually separated. Although FIG. 18 shows that the memory block BLKi is connected to eight gate lines GTL1, GTL2, ..., GTL8 and three bit lines BL1, BL2, and BL3, embodiments are not limited thereto.

Figure 19:
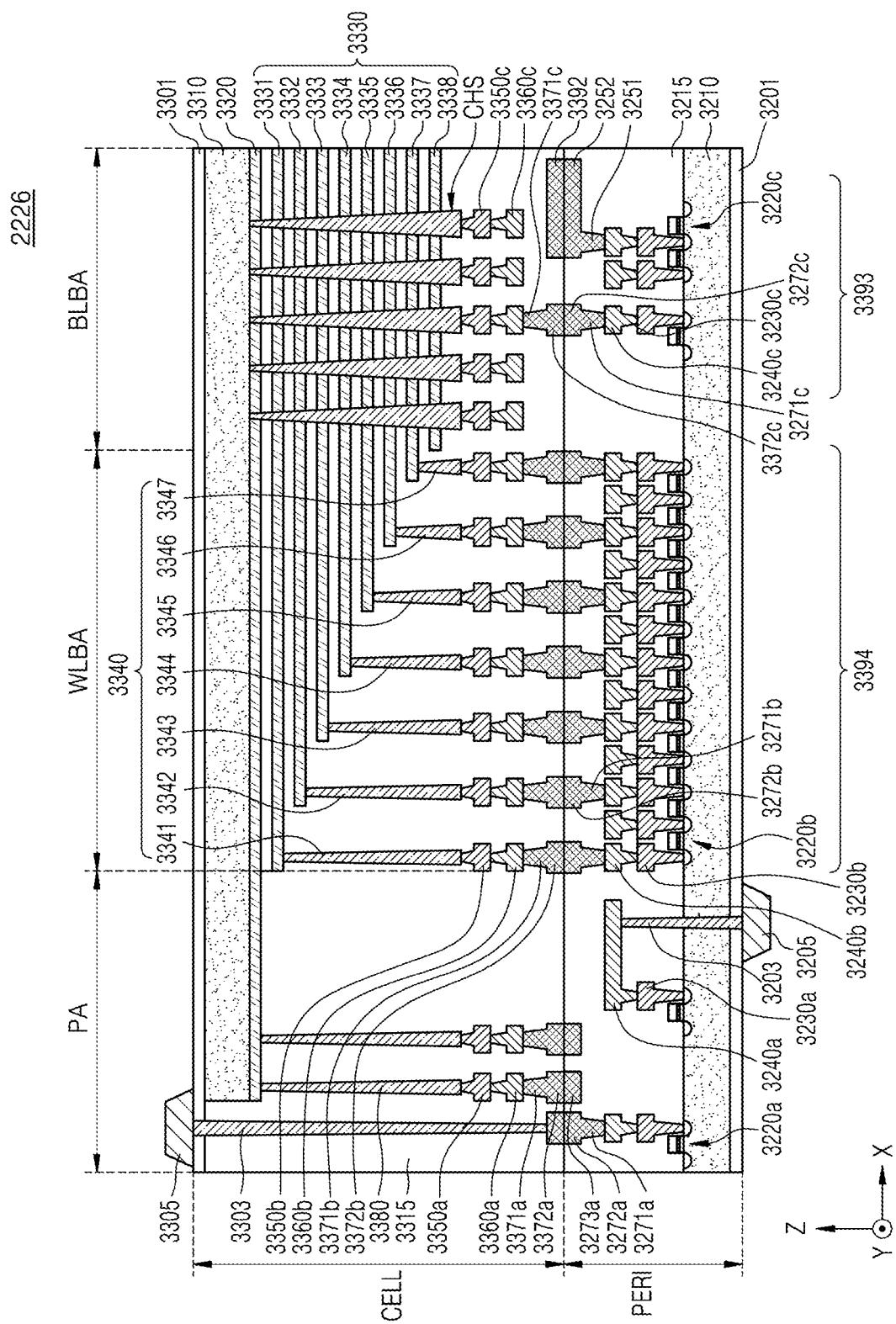
FIG. 19 is a cross-sectional view of a BVNAND structure applicable to a UFS device, according to an example embodiment.

FIG. 19 is a cross-sectional view of a Bonding Vertical NAND (BVNAND) structure applicable to a UFS device, according to an example embodiment.

Referring to FIG. 19, a memory device 2226 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals include copper (Cu) the chips may be bonded using a Cu-to-Cu bonding. Embodiments, however, are not limited thereto. In an example embodiment, the bonding metals may also be formed of aluminum (Al) or tungsten (W).

Each of the peripheral circuit region PERI and the cell region CELL of the memory device 2226 may include an external pad bonding area PA, a word line bonding area WLBA, and a bit line bonding area BLBA.

The peripheral circuit region PERI may include a first substrate 3210, an interlayer insulating layer 3215, a plurality of circuit elements 3220*a*, 3220*b*, and 3220*c* formed on the first substrate 3210, first metal layers 3230*a*, 3230*b*, and 3230*c* respectively connected to the plurality of circuit elements 3220*a*, 3220*b*, and 3220*c*, and second metal layers 3240*a*, 3240*b*, and 3240*c* formed on the first metal layers 3230*a*, 3230*b*, and 3230*c*. In an example embodiment, the first metal layers 3230*a*, 3230*b*, and 3230*c* may be formed of tungsten having relatively high electrical resistivity, and the second metal layers 3240*a*, 3240*b*, and 3240*c* may be formed of copper having relatively low electrical resistivity.

In an example embodiment illustrate in FIG. 19, although only the first metal layers 3230*a*, 3230*b*, and 3230*c* and the second metal layers 3240*a*, 3240*b*, and 3240*c* are shown and described, embodiments are not limited thereto, and one or more additional metal layers may be formed on the second metal layers 3240*a*, 3240*b*, and 3240*c*. At least a portion of the one or more additional metal layers formed on the second metal layers 3240*a*, 3240*b*, and 3240*c* may be formed of aluminum or the like having a lower electrical resistivity than those of copper forming the second metal layers 3240*a*, 3240*b*, and 3240*c*.

The interlayer insulating layer 3215 may be disposed on the first substrate 3210 and cover the plurality of circuit elements 3220*a*, 3220*b*, and 3220*c*, the first metal layers 3230*a*, 3230*b*, and 3230*c*, and the second metal layers 3240*a*, 3240*b*, and 3240*c*. The interlayer insulating layer 3215 may include an insulating material such as silicon oxide, silicon nitride, or the like.

Lower bonding metals 3271*b* and 3272*b* may be formed on the second metal layer 3240*b* in the word line bonding area WLBA. In the word line bonding area WLBA, the lower bonding metals 3271*b* and 3272*b* in the peripheral circuit region PERI may be electrically bonded to upper bonding metals 3371*b* and 3372*b* of the cell region CELL. The lower bonding metals 3271*b* and 3272*b* and the upper bonding metals 3371*b* and 3372*b* may be formed of aluminum, copper, tungsten, or the like. The upper bonding metals 3371*b* and 3372*b* in the cell region CELL may be referred as first metal pads and the lower bonding metals 3271*b* and 3272*b* in the peripheral circuit region PERI may be referred as second metal pads.

The cell region CELL may include at least one memory block. The cell region CELL may include a second substrate 3310 and a common source line 3320. On the second substrate 3310, a plurality of word lines 3331 to 3338 (i.e., 3330) may be stacked in a direction (a Z-axis direction), perpendicular to an upper surface of the second substrate 3310. At least one string select line and at least one ground select line may be arranged on and below the plurality of word lines 3330, respectively, and the plurality of word lines 3330 may be disposed between the at least one string select line and the at least one ground select line.

In the bit line bonding area BLBA, a channel structure CHS may extend in a direction (a Z-axis direction), perpendicular to the upper surface of the second substrate 3310, and pass through the plurality of word lines 3330, the at least one string select line, and the at least one ground select line. The channel structure CHS may include a data storage layer, a channel layer, a buried insulating layer, and the like. The channel layer may be electrically connected to a first metal layer 3350*c* and a second metal layer 3360*c*. In an example embodiment, the first metal layer 3350*c* may be a bit line contact, and the second metal layer 3360*c* may be a bit line. In an example embodiment, the bit line 3360*c* may extend in a first direction (a Y-axis direction), parallel to the upper surface of the second substrate 3310.

In an example embodiment, referring to FIG. 19, an area in which the channel structure CHS, the bit line 3360*c*, and the like are disposed may be defined as the bit line bonding area BLBA. In the bit line bonding area BLBA, the bit line 3360*c* may be electrically connected to the circuit elements 3220*c* providing a page buffer 3393 in the peripheral circuit region PERI. The bit line 3360*c* may be connected to upper bonding metals 3371*c* and 3372*c* in the cell region CELL, and the upper bonding metals 3371*c* and 3372*c* may be connected to lower bonding metals 3271*c* and 3272*c* connected to the circuit elements 3220*c* of the page buffer 3393.

In the word line bonding area WLBA, the plurality of word lines 3330 may extend in a second direction (an X-axis direction), parallel to the upper surface of the second substrate 3310 and perpendicular to the first direction, and may be connected to a plurality of cell contact plugs 3341 to 3347 (i.e., 3340). The plurality of word lines 3330 and the plurality of cell contact plugs 3340 may be connected to each other in pads provided by at least a portion of the plurality of word lines 3330 extending in different lengths in the second direction. A first metal layer 3350*b* and a second metal layer 3360*b* may be connected to an upper portion of the plurality of cell contact plugs 3340 connected to the plurality of word lines 3330, sequentially. The plurality of cell contact plugs 3340 may be connected to the peripheral circuit region PERI by the upper bonding metals 3371*b* and 3372*b* of the cell region CELL and the lower bonding metals 3271b and 3272b of the peripheral circuit region PERI in the word line bonding area WLBA.

The plurality of cell contact plugs 3340 may be electrically connected to the circuit elements 3220b forming a row decoder 3394 in the peripheral circuit region PERI. In an example embodiment, operating voltages of the circuit elements 3220b forming the row decoder 3394 may be different than operating voltages of the circuit elements 3220c forming the page buffer 3393. For example, operating voltages of the circuit elements 3220c forming the page buffer 3393 may be greater than operating voltages of the circuit elements 3220b forming the row decoder 3394.

A common source line contact plug 3380 may be disposed in the external pad bonding area PA. The common source line contact plug 3380 may be formed of a conductive material such as a metal, a metal compound, polysilicon, or the like, and may be electrically connected to the common source line 3320. A first metal layer 3350a and a second metal layer 3360a may be stacked on an upper portion of the common source line contact plug 3380, sequentially. In an example embodiment, an area in which the common source line contact plug 3380, the first metal layer 3350a, and the second metal layer 3360a are disposed may be defined as the external pad bonding area PA.

Input-output pads 3205 and 3305 may be disposed in the external pad bonding area PA. Referring to FIG. 19, a lower insulating film 3201 covering a lower surface of the first substrate 3210 may be formed below the first substrate 3210, and a first input-output pad 3205 may be formed on the lower insulating film 3201. The first input-output pad 3205 may be connected to at least one of the plurality of circuit elements 3220a, 3220b, and 3220c disposed in the peripheral circuit region PERI through a first input-output contact plug 3203, and may be separated from the first substrate 3210 by the lower insulating film 3201. A side insulating film may be disposed between the first input-output contact plug 3203 and the first substrate 3210 to electrically separate the first input-output contact plug 3203 and the first substrate 3210.

An upper insulating film 3301 covering the upper surface of the second substrate 3310 may be formed on the second substrate 3310, and a second input-output pad 3305 may be disposed on the upper insulating film 3301. The second input-output pad 3305 may be connected to at least one of the plurality of circuit elements 3220a, 3220b, and 3220c disposed in the peripheral circuit region PERI through a second input-output contact plug 3303. In an example embodiment, the second input-output pad 3305 may be electrically connected to a circuit element 3220a.

In an example embodiment, the second substrate 3310 and the common source line 3320 may not be disposed in an area in which the second input-output contact plug 3303 is disposed. Also, the second input-output pad 3305 may not overlap the word lines 3330 in the third direction (the Z-axis direction). Referring to FIG. 19, the second input-output contact plug 3303 may be separated from the second substrate 3310 in a direction, parallel to the upper surface of the second substrate 3310, and may pass through the interlayer insulating layer 3315 of the cell region CELL to be connected to the second input-output pad 3305.

In an example embodiment, the first input-output pad 3205 and the second input-output pad 3305 may be selectively formed. In an example embodiment, the memory device 2226 may include only the first input-output pad 3205 disposed on the first substrate 3210 or the second input-output pad 3305 disposed on the second substrate 3310. Alternatively, the memory device 2226 may include both the first input-output pad 3205 and the second input-output pad 3305.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 2226 may include a lower metal pattern 3273a, corresponding to an upper metal pattern 3372a formed in an uppermost metal layer of the cell region CELL, and having the same cross-sectional shape as the upper metal pattern 3372a of the cell region CELL so as to be connected to each other, in an uppermost metal layer of the peripheral circuit region PERI. In the peripheral circuit region PERI, the lower metal pattern 3273a formed in the uppermost metal layer of the peripheral circuit region PERI may not be connected to a contact. Similarly, in the external pad bonding area PA, an upper metal pattern 3372a, corresponding to the lower metal pattern 3273a formed in an uppermost metal layer of the peripheral circuit region PERI, and having the same shape as a lower metal pattern 3273a of the peripheral circuit region PERI, may be formed in an uppermost metal layer of the cell region CELL.

The lower bonding metals 3271b and 3272b may be formed on the second metal layer 3240b in the word line bonding area WLBA. In the word line bonding area WLBA, the lower bonding metals 3271b and 3272b of the peripheral circuit region PERI may be electrically connected to the upper bonding metals 3371b and 3372b of the cell region CELL by a Cu-to-Cu bonding.

In the bit line bonding area BLBA, an upper metal pattern 3392, corresponding to a lower metal pattern 3252 formed in the uppermost metal layer of the peripheral circuit region PERI, and having the same cross-sectional shape as the lower metal pattern 3252 of the peripheral circuit region PERI, may be formed in an uppermost metal layer of the cell region CELL. A contact may not be formed on the upper metal pattern 3392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

As described above, embodiments may provide a system, device, and method for protecting data, written in a protected region, from attacks.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of writing data to a protected region in response to a write request of a host, the method comprising:
   transmitting a first response to the host, the first response including a first device message authentication code and a first device message;
   receiving a first request from the host, the first request including a first host message authentication code and a first host message;
   generating a first message verification code based on the first device message authentication code and the first host message;
   verifying the first request based on the first host message authentication code and the first message verification code;
   generating a second device message authentication code based on a second device message and the first message verification code, the second device message including a result of verifying the first request; and
   transmitting a second response to the host, the second response including the second device message authentication code and the second device message.

2. The method as claimed in claim 1, further comprising extracting a result of verifying the first response from the first host message, wherein the generating of the second device message authentication code includes generating the second device message authentication code based on the second device message independently of the first message verification code when verification of the first response fails.

3. The method as claimed in claim 1, wherein the generating of the first message verification code includes:
   extracting a first random number from the first host message; and
   generating the first message verification code based on the first random number, the first device message authentication code, and the first host message.

4. The method as claimed in claim 3, wherein the generating of the second device message authentication code includes generating the second device message authentication code based on the first random number and the first message verification code.

5. The method as claimed in claim 1, wherein the verifying of the first request includes:
   comparing the first host message authentication code with the first message verification code; and
   determining success of the verification of the first request when the first host message authentication code is identical to the first message verification code.

6. The method as claimed in claim 1, wherein the first device message includes a first write count, the first host message includes a data write request and the first write count, and the second device message includes a write result and a second write count.

7. The method as claimed in claim 1, wherein the generating of the first message verification code and the generating of the second device message authentication code are performed based on a key that is shared with the host in advance.

8. A storage device configured to communicate with a host, the storage device comprising:
   a memory including a protected region; and
   a controller configured to provide the host with a first response including a first device message authentication code and a first device message, receive a first write request from the host, the first write request including a first host message authentication code and a first host message, generate a first message verification code based on the first device message authentication code and the first host message, verify the first write request based on the first host message authentication code and the first message verification code, write data included in the first write request to the protected region when the verification of the first write request succeeds, generate a second device message authentication code based on a second device message and the first message verification code, the second device message including a result of verifying the first write request, and provide the host with a second response including the second device message authentication code and the second device message.

9. The storage device as claimed in claim 8, wherein the controller is further configured to extract a result of verifying the first response from the first host message, generate a second device message authentication code based on a second device message independently of the first message verification code when verification of the first response fails, the second device message including a result of verifying the first write request, and provide the host with a second response including the second device message authentication code and the second device message.

10. The storage device as claimed in claim 8, wherein the controller is further configured to extract a first random number from the first write request and generate the first message verification code based on the first random number, the first device message authentication code, and the first host message.

11. The storage device as claimed in claim 8, wherein the controller is further configured to determine a success of the verification of the first write request when the first host message authentication code is identical to the first message verification code.

12. A method of writing data to a storage device including a protected region, the method comprising:
   transmitting a first request to the storage device, the first request including a first host message authentication code and a first host message;
   receiving a first response from the storage device, the first response including a first device message authentication code and a first device message;
   generating a first message verification code based on the first host message authentication code and the first device message;
   verifying the first response based on the first device message authentication code and the first message verification code;
   generating a second host message authentication code based on the first message verification code and a second host message when the verification of the first response succeeds; and
   transmitting a second request to the storage device, the second request including the second host message authentication code and the second host message.

13. The method as claimed in claim 12, further comprising:
   generating a third host message authentication code based on a third host message independently of the first device message authentication code when the verification of the first response fails; and
   transmitting a third request to the storage device, the third request including the third host message authentication code and the third host message.

14. The method as claimed in claim 13, further comprising generating the third host message including information indicating a failure of the verification of the first response when the verification of the first response fails.

15. The method as claimed in claim 12, wherein the generating of the first message verification code includes:
- acquiring a first random number used to generate the first host message authentication code; and
- generating the first message verification code based on the first random number, the first host message authentication code, and the first device message.

16. The method as claimed in claim 15, wherein the generating of the second host message authentication code includes:
- generating a second random number; and
- generating the second host message authentication code based on the second random number, the first message verification code, and the second host message.

17. The method as claimed in claim 12, wherein the verifying of the first response includes:
- comparing the first device message authentication code with the first message verification code; and
- determining a success of the verification of the first response when the first device message authentication code is identical to the first message verification code.

18. The method as claimed in claim 12, wherein the first host message includes a request to read a write count, the first device message includes the write count, and the second host message includes a data write request and the write count.

19. The method as claimed in claim 12, wherein the generating of the first message verification code and the generating of the second host message authentication code are performed based on a key that is shared with the storage device in advance.

* * * * *